(12) United States Patent
Tanaka et al.

(10) Patent No.: US 6,419,810 B1
(45) Date of Patent: Jul. 16, 2002

(54) METHOD OF MANUFACTURING AN OPTICAL FIBER CONNECTOR

(75) Inventors: Tetsuo Tanaka, Utsunomiya; Shinichi Okamoto, Hasuda, both of (JP)

(73) Assignee: Tetsuo Tanaka, Yamagata (JP)

( * ) Notice: Subject to any disclaimer, the term of this patent is extended or adjusted under 35 U.S.C. 154(b) by 0 days.

(21) Appl. No.: 09/449,999

(22) Filed: Nov. 26, 1999

(30) Foreign Application Priority Data

Nov. 26, 1998 (JP) .......................................... 10-375372

(51) Int. Cl.$^7$ ................................................ C25D 1/02
(52) U.S. Cl. ............................ 205/73; 205/50; 205/78; 205/79; 385/60; 385/78
(58) Field of Search ............................. 205/73, 78, 79, 205/50; 385/60, 78

(56) References Cited

U.S. PATENT DOCUMENTS

| | | | |
|---|---|---|---|
| 4,290,857 A | * 9/1981 | Ikeda et al. .................... 205/73 |
| 5,478,699 A | * 12/1995 | Blessington et al. ......... 430/308 |
| 5,909,528 A | 6/1999 | Tamekuni et al. | |
| 5,953,477 A | 9/1999 | Wach et al. | |
| 6,173,097 B1 | 1/2001 | Throckmorton et al. | |
| 6,174,424 B1 | 1/2001 | Wach et al. | |

FOREIGN PATENT DOCUMENTS

| | | |
|---|---|---|
| EP | 0 780 710 | 6/1997 |
| EP | 0 851 253 | 7/1998 |
| JP | 59-38395 | 3/1984 |
| JP | 3-50245 | 8/1991 |
| JP | 10-111433 | 4/1998 |
| JP | 10-123349 | 5/1998 |
| JP | 11-193485 | 7/1999 |
| JP | 11-211935 | 8/1999 |
| JP | 11-305069 | 11/1999 |

* cited by examiner

*Primary Examiner*—Bruce F. Bell
*Assistant Examiner*—Wesley A. Nicolas
(74) *Attorney, Agent, or Firm*—Nixon & Vanderhye P.C.

(57) ABSTRACT

Electroforming is performed in an electroforming bath with a cathode of a metal wire member immersed in an electroforming solution to electrodeposit nickel around the aluminum alloy wire member. The aluminum alloy wire member is removed by dissolution with an alkaline solution from an obtained nickel electroformed product. Accordingly, a nickel cylinder is obtained, which has a through-hole formed corresponding to the wire member. The cylinder is cut into those having a predetermined length. The outer circumference is subjected to cutting based on the through-hole to obtain a ferrule. The inner diameter accuracy of the through-hole of the ferrule is determined by the outer diameter accuracy of the wire member.

32 Claims, 15 Drawing Sheets

Fig. 1(A-1) (PRIOR ART)
Fig. 1(A-2) (PRIOR ART)
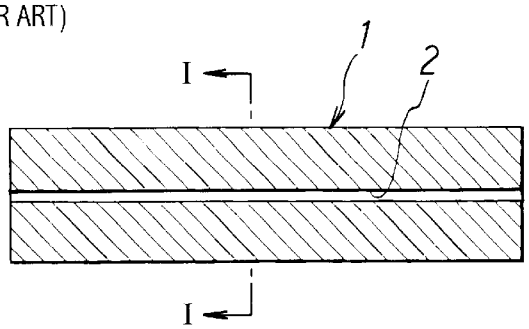 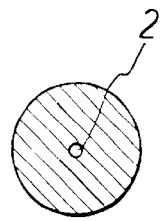
Fig. 1(B-1) (PRIOR ART)
Fig. 1(B-2) (PRIOR ART)
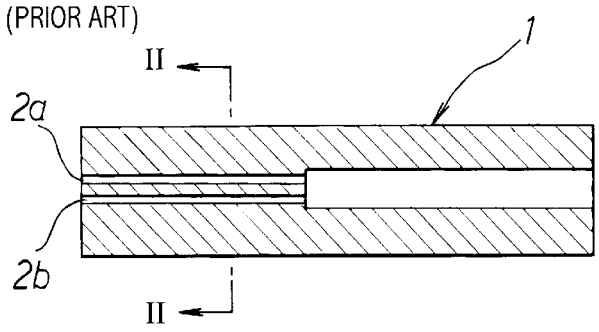 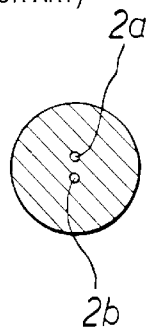
Fig. 1(C) (PRIOR ART)
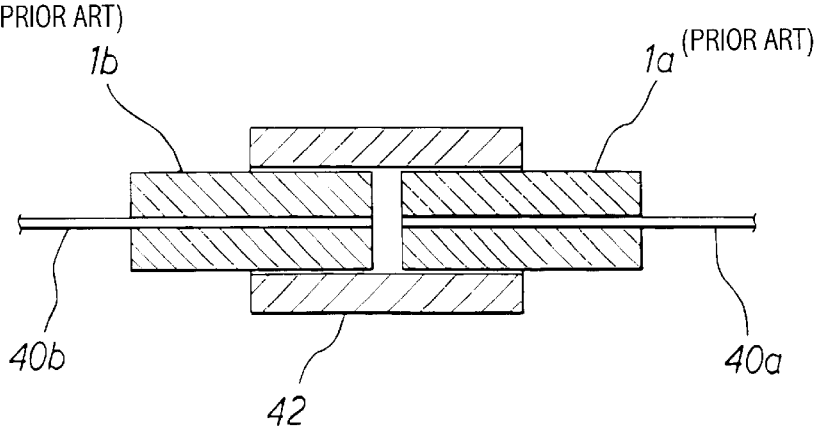

METHOD OF MANUFACTURING AN OPTICAL FIBER CONNECTOR

BACKGROUND OF THE INVENTION

1. Field of Invention

The present invention relates to an optical fiber connector, a ferrule to be used for the optical fiber connector, and a method for producing the ferrule. In particular, the present invention relates to an optical fiber connector for correctly aligning mutual positions of cores of optical fibers and connecting them to one another by inserting the optical fibers into cylindrical ferrules to support them, a ferrule to be used for the optical fiber connector, and a method for producing the ferrule. The present invention also relates to a wire member-supporting apparatus to be used for producing the ferrule.

2. Description of the Related Art

In recent years, the electric cable for the telephone line is being replaced with the optical fiber cable on a worldwide scale. The use of the optical fiber is not limited to the optical communication based on the telephone. The optical fiber is also widely used for optical devices, apparatuses for LAN, and a variety of optical systems. Methods are known to mutually connect optical fibers in such an optical communication system, including a permanent connection method based on the use of fusion or mechanical splice, and a detachable connection method based on the use of an optical fiber connector. It is required for the optical fiber connector used for the latter method that attachment and detachment can be easily performed, and the optical fiber connector is resistant to the environment. Additionally, in order to respond to the demand for the optical communication system to realize long distance communication and large capacity, for example, it is required for the optical fiber connector that the connection loss is low, and the nonreflective treatment is applied in order to stabilize laser transmission.

Conventionally, as shown in (C) of FIG. 1, an optical fiber connector comprises tubular parts (hereinafter referred to as "ferrules") 1a, 1b having a perfect circular cross section for highly accurately holding optical fibers 40a, 40b having a diameter of about 0.13 mm at predetermined positions and fixing them coaxially, and an aligning section 42 for holding the ferrules 1a, 1b while allowing them to make mutual abutment. For example, the ferrule has a columnar configuration as shown in (A) of FIG. 1, and it is made of a zirconia ceramic material or the like. The ferrule 1 shown in (A) of FIG. 1 is a ferrule of the one-core type. For example, the ferrule 1 has a perfect circular through-hole 2 of $\phi=0.126$ mm which is formed in the longitudinal direction at the center of the column having a length of about 8 mm. A ferrule 1' shown in (B) of FIG. 1 is a ferrule of the two-core type. The ferrule 1' is bored with two through-holes 2a, 2b for allowing two optical fibers to pass therethrough.

When the ferrule as shown in (A) of FIG. 1 is produced, the following method has been hitherto adopted. At first, a mixture of zirconia powder and resin is used as a raw material which is molded to have a cylindrical configuration by employing, for example, a mold for injection molding or extrusion molding to mold the cylindrical configuration. Subsequently, a molded product is fired at a temperature of about 500° C. to decompose the resin component, followed by being fired at a high temperature of about 1200° C. An obtained cylindrical fired product has a through-hole into which a diamond-polishing member having a liner configuration is inserted so that the inner diameter of the through-hole is finely adjusted. Finally, the outer portion of the cylindrical product is machined about the center of the inner hole to finish the ferrule so that it has a perfect circular shape.

In the molding method described above, the fired molded product is slightly contracted due to the firing, and the inner diameter thereof is deviated from a desired dimension. For this reason, the polishing process based on the use of the diamond-polishing member, which is performed after the firing, is a necessary and indispensable treatment. However, the polishing process is laborious, and it requires skill, causing the decrease in productivity. Further, it has been not easy to obtain a perfectly uniform inner diameter concerning the position in the axial direction of the inner hole of the fired product even when the polishing process is performed, for example, because the diamond is not uniformly attached to the linear polishing member. Further, a problem arises in that the equipment cost is expensive, because the diamond-polishing member is consumed and exhausted.

A molding machine and a mold, which are expensive and specialized in this purpose, are required to perform the injection molding or the extrusion molding as described above. Especially, the molding machine and the mold are conspicuously abraded by the extremely hard zirconia powder, and hence their service lives are short as well. It is also possible to use a hard material for the surfaces of the molding machine and the mold. However, the production cost is extremely expensive for such a special molding machine and a special mold. Further, the energy cost is increased, and the energy source is wasted as well, because the firing is performed at a high temperature of 500 to 1200° C. in the firing step. If the production cost of the ferrule is increased as described above, the production cost of an optical fiber connector including the ferrule accommodated therein is also increased.

Further, the following problem also arises. Although the ferrule of the one-core type as shown in (A) of FIG. 1 has been hitherto dominantly used, the ferrule of the two-core type as shown in (B) of FIG. 1 or ferrules having more than two cores are gradually demanded. In the case of the ferrules having two or more cores, it is extremely difficult to perform the step to establish the dimension by means of the polishing with the diamond-polishing member. The production of ferrules having three or more cores has been substantially impossible.

When optical fibers are connected to one another by using an optical fiber connector, the process is executed by means of the connection in which tips of the optical fibers are allowed to make mutual abutment, i.e., so-called physical contact (hereinafter referred to as "PC"), in order to decrease the reflection loss at the connecting portion. In order to achieve the PC connection, the following processing has been performed. That is, the end surface of the ferrule is polished to have a convex spherical surface or an oblique convex spherical surface, or the end surface of the ferrule is polished to have a flat surface or an oblique flat surface, together with the tip of the optical fiber in a state in which the optical fiber is charged in the ferrule. The conventional ferrule made of zirconia or glass has involved the problem that such process cannot be easily performed.

In the conventional technique, when the ferrule is installed to the optical fiber connector, then the ferrule is installed in a holder, and it is installed to the optical fiber connector together with the holder, in order to adjust the rotational position of the ferrule. A problem has been also pointed out in that the number of parts of the optical fiber connector is increased due to the use of such a holder.

SUMMARY OF THE INVENTION

The present invention has been made in consideration of the problems involved in the conventional technique as described above, a first object of which is to provide a ferrule, a method for producing the same, and an apparatus for producing the same, wherein the ferrule can be produced at low energy cost with a simple and cheap equipment without any necessity for the expensive and special equipment such as a molding machine and a mold.

A second object of the present invention is to provide a ferrule, a method for producing the same, and an apparatus for producing the same, wherein the ferrule is excellent in dimensional stability, and it can be produced in accordance with a process with high productivity without necessitating any special skill of an operator.

A third object of the present invention is to provide a ferrule, a method for producing the ferrule, and an apparatus for producing the ferrule, wherein the ferrule can be easily produced even when it is designed to have multiple cores.

A fourth object of the present invention is to provide a ferrule involving an extremely small dimensional error, if any, wherein the ferrule can be easily produced.

A fifth object of the present invention is to provide an optical fiber connector at low cost, which makes it possible to connect optical fibers with high accuracy.

According to a first aspect of the present invention, there is provided a method for producing a ferrule to be used for connecting optical fibers, the method comprising:

depositing a metal by means of electroforming around at least one wire member to produce a rod-shaped electroformed product; and removing the wire member from the electroformed product.

The method of the present invention is characterized in that the extremely thin wire member is used as a base mold to produce the ferrule in accordance with the electroforming method. The inner diameter of the obtained metal tube is determined by the outer diameter of the wire member. The inner diameter accuracy of the metal tube is also determined by the outer diameter accuracy of the wire member. Therefore, the ferrule, which has the extremely excellent inner diameter accuracy, can be obtained with the wire member which has a cross section (perfect circle) similar to that of the optical fiber, which has a width or a diameter slightly larger than that of the optical fiber, and which has highly accurate linearity and roundness. The obtained ferrule includes an inner hole which has high linearity and roundness. Therefore, it is unnecessary to perform the polishing operation having been hitherto performed to ensure the dimensional accuracy of the inner diameter of the ferrule. In order to remove the wire member from the electroformed product, only the wire member may be dissolved out of the electroformed product, or the wire member is extracted or extruded from the electroformed product, after the metal is deposited around the wire member in accordance with the electroforming. Accordingly, it is possible to obtain the cylindrical metal tube which is formed with the through-hole corresponding to the cross-sectional shape of the wire member. It is desirable that the wire member to be used is a wire member having an outer diameter of not more than 0.2 mm, especially not more than 0.13 mm.

In order to obtain the ferrule by machining the electroformed product, the electroformed product is cut into those having a predetermined length. The outer circumference of the electroformed product may be subjected to cutting about the center of a through-hole which is formed by removing the wire member from the electroformed product.

In the method of the present invention, for example, when the wire member is made of aluminum or alloy thereof, it is preferable that the wire member is removed from the electroformed product by dissolving the wire member with an alkaline or acidic solution after the electroforming. When the wire member is made of iron or alloy thereof, it is preferable that a mold release treatment is applied to the wire member before the electroforming, and the wire member is removed from the electroformed product by extracting or extruding the wire member from the electroformed product after the electroforming.

In the method of the present invention, a two-core ferrule may be produced by arranging two wire members so that they are separated from each other by a predetermined distance to perform the electroforming. In this procedure, the two wire members are arranged so that a pair of pins each having an identical diameter are interposed by the wire members, and thus the spacing distance between the two wire members can be controlled easily and highly accurately. A ferrule having three or more cores can be also produced such that three or more wire members are arranged in parallel to one another while being separated from each other by an identical spacing distance, for example, with two or more pins.

According to a second aspect of the present invention, there is provided a metal ferrule produced in accordance with the method according to the first aspect.

According to a third aspect of the present invention, there is provided a ferrule to be used for connecting optical fibers, the ferrule being formed of only a metal material in an integrated manner.

The metal ferrule of the present invention can be produced, for example, by means of the electroforming method of the present invention extremely accurately, easily, and cheaply. When two optical fibers are joined to one another via an optical fiber connector which accommodates the ferrule, the tip of the ferrule is polished together with the optical fiber for the purpose of flat junction or PC junction. The ferrule of the present invention is polished extremely easily, because it is made of metal. The polishing operation, which is highly accurately controlled, can be applied to the ferrule of the present invention. Therefore, it is possible to perform the PC junction in a well suited manner, and it is possible to join optical fibers with low reflection loss.

The ferrule of the present invention has, at its both ends, holes for allowing the optical fiber to penetrate therethrough, the holes being machined to have a tapered configuration, and it may be used as a sleeve for a mechanical splice.

The ferrule may have a columnar hollow section penetrating in a longitudinal direction of the ferrule, the ferrule may have, at its first end, a first opening which has the same diameter as that of the hollow section, and the ferrule may have, at its second end, a second opening which has a diameter larger than the diameter of the hollow section (see FIG. 20). The hollow section may include a first hollow section, a second hollow section which has a diameter larger than that of the first hollow section, and a third hollow section having a tapered configuration which connects the first hollow section and the second hollow section. In this arrangement, a coated portion of the optical fiber is accommodated in the second hollow section, and a clad of the optical fiber is accommodated in the first hollow section. That is, the second hollow section functions as a conventional ferrule holder. The third hollow section facilitates the introduction of the clad of the optical fiber into the first hollow section.

According to a third aspect of the present invention, there is provided an optical fiber connector for connecting optical fibers, comprising:

a ferrule formed of only a metal material in an integrated manner; and a housing for accommodating the ferrule.

The polishing process for PC connection can be carried out easily and highly accurately, because the optical fiber connector of the present invention includes the ferrule made of metal. Therefore, it is possible to realize the optical fiber connector with low reflection loss at low cost. The metal ferrule described above is preferably produced by means of the electroforming method according to the present invention.

The housing of the optical fiber connector of the present invention may function as a plug or a jack. The optical fiber connector may further comprise a sleeve for aligning two ferrules. The optical fiber connector may further comprise an adapter for making detachable connection to the plug. In this arrangement, the adapter may include a sleeve for aligning the ferrule at its inside. The optical fiber connector may further comprise an optical fiber cable.

According to a fourth aspect of the present invention, there is provided a wire member-supporting apparatus for being used when a ferrule having multiple cores for connecting optical fibers is produced by means of electroforming, the apparatus comprising:

a base plate;

a pair of first positioning projections provided mutually opposingly on the base plate, each of the first projections having an identical width; and two wire members stretched in parallel to one another with the pair of first positioning projections interposed therebetween.

The apparatus of the present invention is extremely effective to be used for the production of the ferrule having the multiple cores, the apparatus being installed in an electroforming bath. The two wire members contact with the projections, for example, such that they are urged against the projections such as reference pins provided on the base plate, in mutually opposite directions. Therefore, the wire members are positioned at both sides of the projections respectively. Accordingly, the spacing distance between the two wire members is highly accurately managed in accordance with the diameter of the reference pin. In order to change the spacing distance between a plurality of inner holes formed in the ferrule having the multiple cores, reference pins having a variety of diameters may be previously prepared, and the reference pins may be appropriately exchanged depending on the spacing distance between the inner holes.

The apparatus may further comprise a pair of second positioning projections provided mutually opposingly on the base plate, each of the second projections having an identical width, and two wire members stretched in parallel to one another with the pair of second positioning projections interposed therebetween, wherein the wire members stretched in parallel to one another with the first projections interposed therebetween are mutually parallel to the wire members stretched in parallel to one another with the second projections interposed therebetween, and the respective adjoining wire members are arranged and separated from each other by an identical distance. Accordingly, it is possible to produce a ferrule of the four-core type in which four inner holes are formed and arranged to give an identical spacing distance.

BRIEF DESCRIPTION OF THE DRAWINGS

FIG. 1 shows cross-sectional views illustrating an optical fiber connector and ferrules, wherein (A) of FIG. 1 shows a longitudinal sectional view of a one-core type ferrule and a sectional view thereof taken in an X—X direction, (B) of FIG. 1 shows a longitudinal sectional view of a two-core type ferrule and a sectional view thereof taken in an X—X direction, and (C) of FIG. 1 shows a schematic sectional view illustrating the optical fiber connector for connecting optical fibers.

DESCRIPTION OF THE PREFERRED EMBODIMENTS OF THE INVENTION

Figure 2:
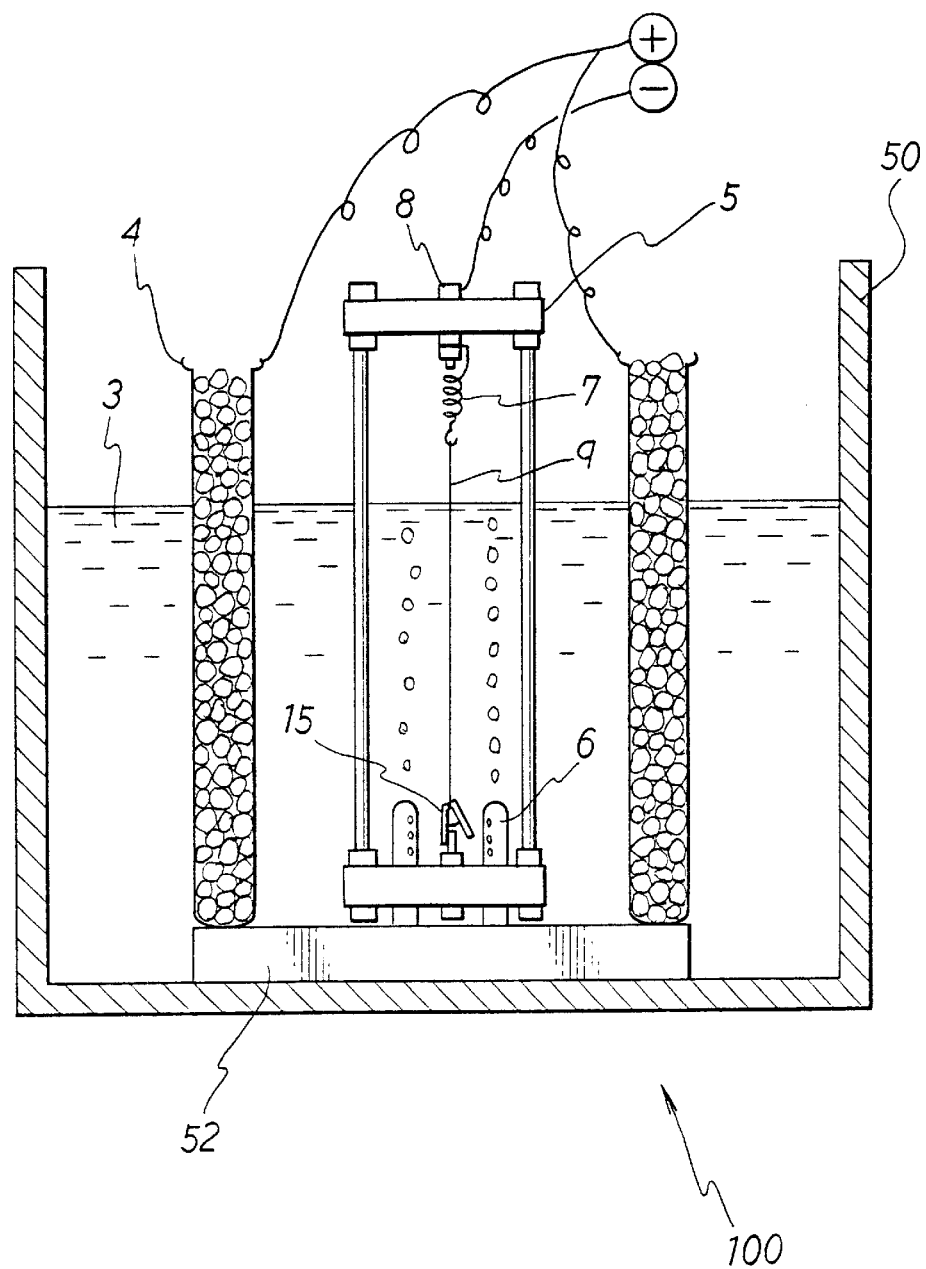
FIG. 2 shows a schematic arrangement of an electroforming apparatus according to an embodiment of the present invention.

At first, explanation will be made with reference to FIG. 2 for an apparatus for producing the ferrule of the present invention by means of the electroforming. The apparatus shown in FIG. 2 comprises an electroforming bath 50, an electroforming solution 3 charged in the electroforming bath 50, and anodes 4 and a cathode 8 which are arranged in the electroforming bath 50. The four anodes 4 are provided to surround the cathode on a base 52 which is installed on the bottom of the electroforming bath 50. As described later on, the cathode 8 is provided on a support jig 5, and it is electrically connected to a wire member 9 which is stretched between upper and lower ends of the support jig 5. Air nozzles 6, which are provided on the base 52, are disposed at intervals of 90 degrees in the circumferential direction of the wire member 9.

The electroforming solution 3 is determined depending on the quality of the metal material to be subjected to the electroforming around the wire member 9, for which it is possible to use, for example, a metal for electroforming such as nickel or alloy thereof, iron or alloy thereof, copper or alloy thereof, cobalt or alloy thereof, tungsten alloy, and fine particle-dispersed metal. Those usable for the electroforming solution 3 include a solution containing a major component of an aqueous solution of nickel sulfamate, nickel chloride, nickel sulfate, ferrous sulfamate, ferrous borofluoride, copper pyrophosphate, copper sulfate, copper borofluoride, copper silicofluoride, copper titanofluoride, copper alkanolsulfonate, cobalt sulfate, sodium tungstate or the like, and a solution obtained by dispersing, in the foregoing solution, fine powder of silicon carbide, tungsten carbide, boron carbide, zirconium oxide, silicon nitride, alumina, diamond or the like. Among them, a bath containing a major component of nickel sulfamate is especially appropriate in view of the easiness of the electroforming, the small stress of the electroformed product, the chemical stability, and the easiness of welding.

The metal component of the electroforming solution serves as a material for constituting the electroformed product, i.e., the ferrule. As described later on, the ferrule is subjected to the PC polishing in order to effect the PC connection. In view of the PC polishing, it is especially preferred to use a nickel/cobalt alloy as the metal component.

The electroforming solution may be filtrated at a high speed in the electroforming bath with a filter (not shown) having a filtration accuracy of about 0.1 to 2 μm, and it may be heated so that its temperature may be controlled to be within a proper temperature range of about 50±5° C. It is preferable that an active carbon treatment may be occasionally applied to remove organic impurities. It is desirable that the electric power is applied at a low current density of about 0.2 A/dm$^2$ to remove metal impurities such as copper from the electroforming solution in the bath by using carbon as an anode and a corrugated sheet made of iron plated with nickel as a cathode.

The anode 4 is selected depending on the metal intended to be electroformed, which is selected, for example, from nickel, iron, copper, and cobalt. Those having a plate-shaped configuration or a spherical configuration may be appropriately used. When the spherical electrodes are used, for example, the spheres may be used such that they are placed in a basket made of titanium, and they are covered with a bag made of polyester.

Figure 3A:
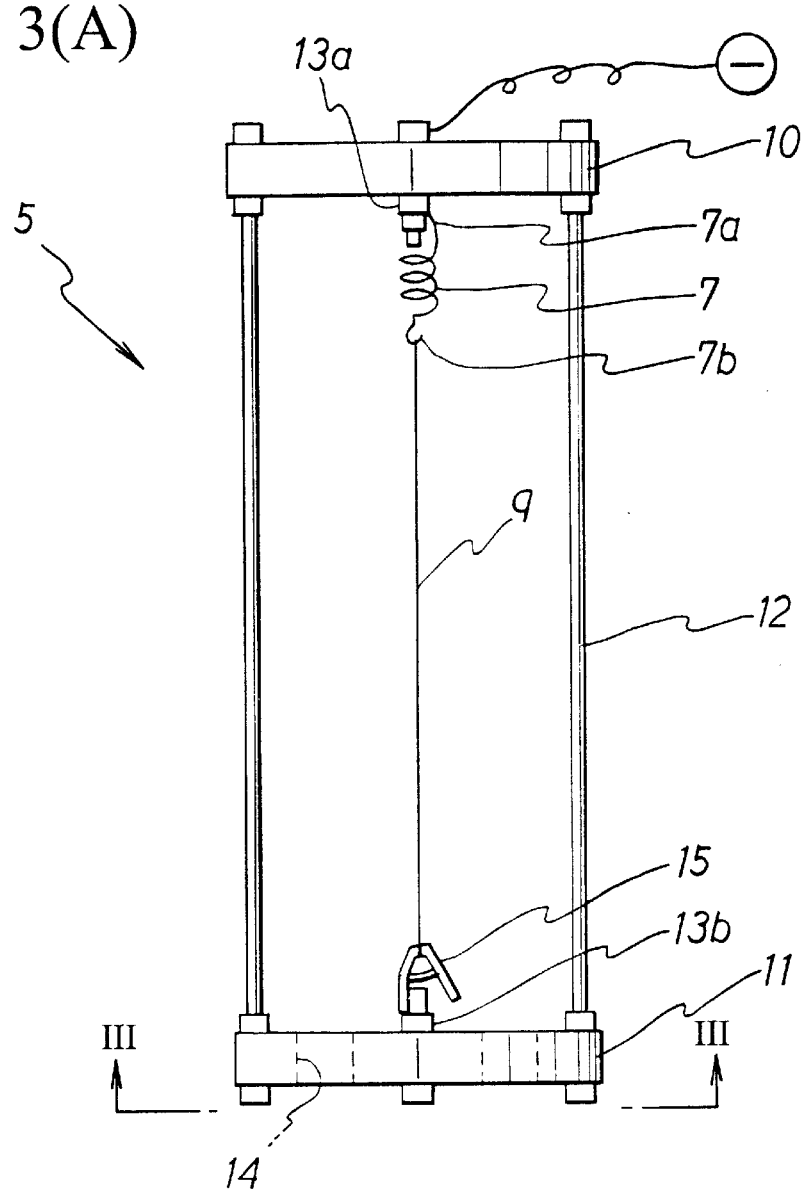
FIG. 3 shows a side view (A) and a plan view (B) illustrating a support jig to be used for the apparatus shown in FIG. 2.
Figure 3B:
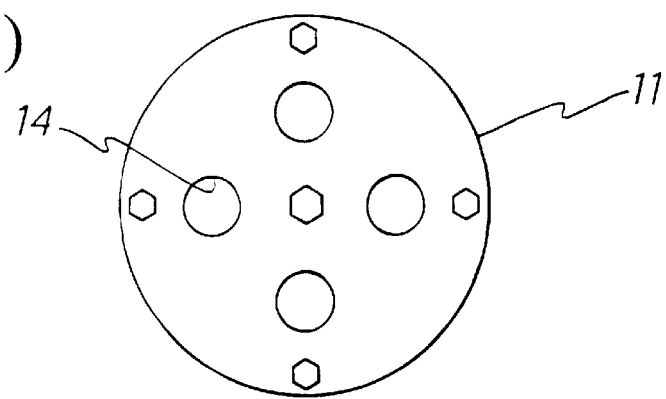

The support jig 5 will be explained in detail with reference to FIG. 3. (A) of FIG. 3 shows a side view, and (B) of FIG. 3 shows a sectional view of a lower plate 11 as viewed in a direction of B—B. The support jig 5 comprises an upper plate 10 and the lower plate 11 which are coupled to one another with four support pillars 12 intervening therebetween. Each of the upper plate 10 and the lower plate 11 may be made of an electrically insulating material such as polyvinyl chloride resin, polyamide resin, polyacetal resin, and polyethylene resin. The support pillar 12 may be made of a metal such as stainless steel and titanium, or plastic. The upper plate 10 and the lower plate 11 may be fixed to the support pillars 12 by the aid of screws (not shown) respectively. A stainless screw 13a, which serves as the cathode 8, is provided at a central portion of the upper plate 10 so that the stainless screw 13a penetrates through the upper plate 10. The stainless screw 13a fixes a first end 7a of a spring 7 made of stainless steel at the lower surface of the upper plate 10. Similarly, a stainless screw 13b is provided at a central portion of the lower plate 11 so that the stainless screw 13b penetrates through the lower plate 11 to protrude from the upper surface of the lower plate 11. A clip 15 made of plastic is fixed to the screw 13b. As described above, circular holes 14 for air nozzles are bored at four positions through the lower plate 11. A first end of the wire member 9 is hooked by a second end 7b of the spring 7 made of stainless steel. A second end of the wire member 9 is grasped by the clip 15 while stretching the wire member 9 and extending the spring 7. When the wire member 9 is attached to the support jig 5 as described above, the wire member 9 is supported in the electroforming bath 50 in a state of being straightly stretched in the vertical direction.

Figure 4:
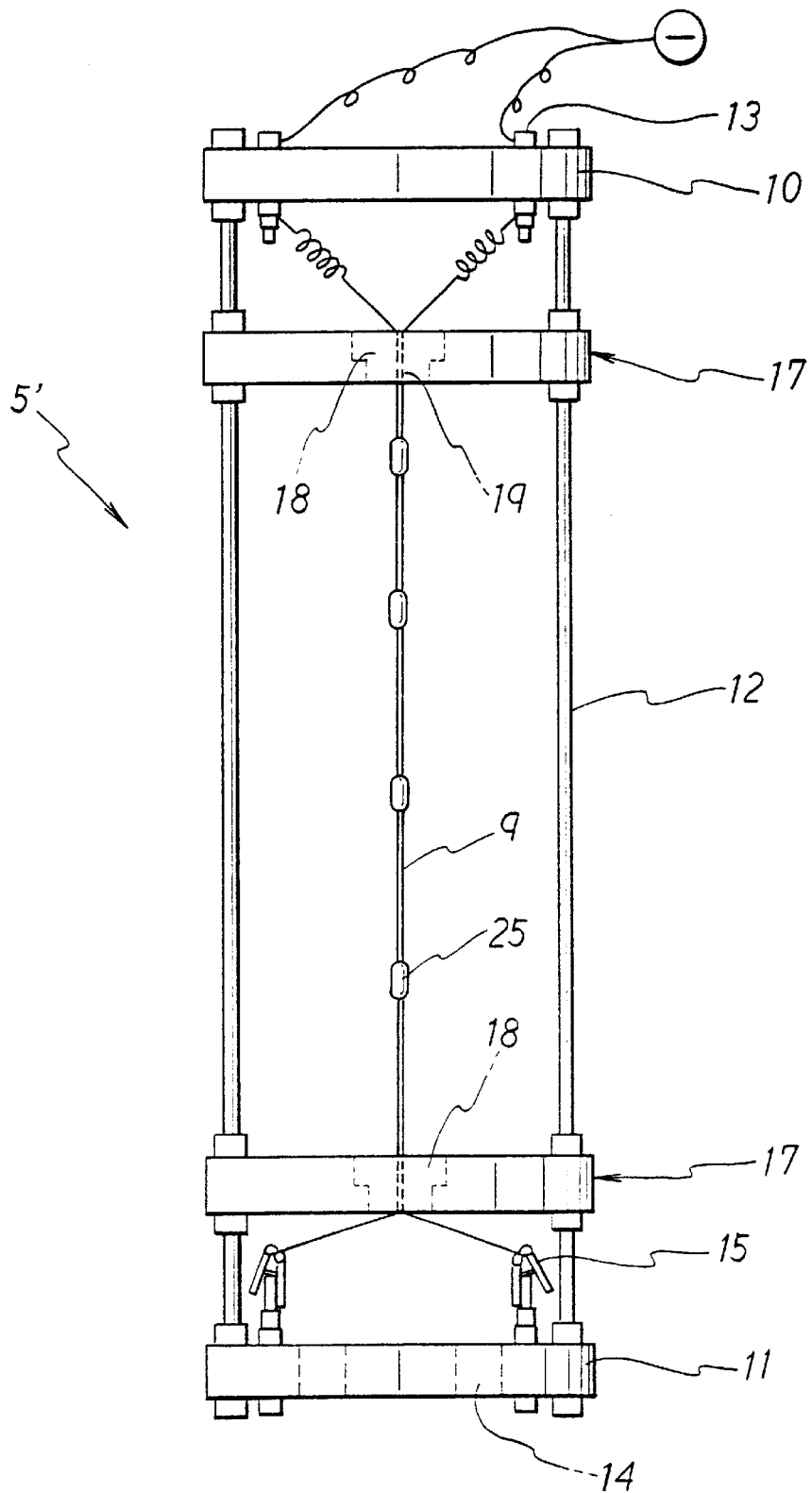
FIG. 4 shows a specified embodiment of the supporting jig which is usable for the apparatus shown in FIG. 2, depicting a side view illustrating the support jig suitable to produce the two-core type ferrule.
Figure 5A:
FIG. 5 shows sectional views (A) to (F) of a variety of wires of those of the multiple-core type other than those having a circular cross section according to the present invention.
Figure 5B:
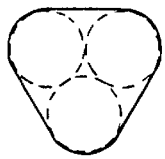
Figure 5C:
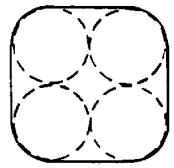
Figure 5D:
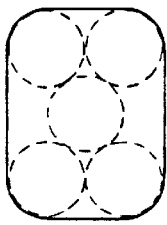
Figure 5E:
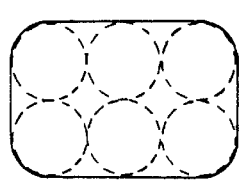
Figure 5F:
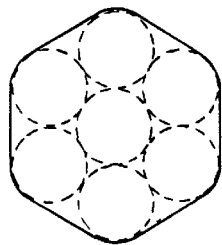
Figure 5G:
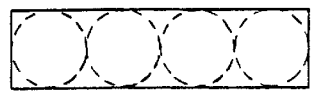

The support jig 5 shown in FIG. 3 is a jig for performing the electroforming of the one-core type ferrule. When a two-core type ferrule is electroformed, for example, it is possible to use a support jig 5' having a structure as shown in FIG. 4. The support jig 5' shown in FIG. 4 includes auxiliary members 17 made of plastic which are provided at two positions between an upper plate 10 and a lower plate 11. A wire-holding member 18 made of plastic, which has pores 19 bored therethrough at two positions, is embedded in a central portion of the auxiliary member 17. Stainless screws 13 and clips 15 are provided at two positions respectively. In order to maintain the predetermined spacing distance and the parallelism of the two wire members 9, solder members 25 for integrating the wire members 9 while being separated from each other by predetermined distances are provided on the wire members 9 supported between the auxiliary members 17. The support jig 5' has the same structure as that of the support jig 5 shown in FIG. 3 except for the structure as specified above.

In the case of the ferrule having three or more cores, the wire-holding member 18 may be modified depending on the number of wires in the same manner as in the support jig 5' shown in FIG. 4, and the numbers of the stainless screws 13 and the clips 15 may be increased. However, the method for holding the wire member 9 is not limited to the method described above. For example, an elastic member such as rubber may be used other than the spring, or a weight may be attached to the lower end of the wire, in the method for stretching the wire. In order to control the spacing distance between the two wire members more accurately, it is preferable to use a support jig which will be explained in the fourth embodiment described later on.

In the case of the ferrule having two or more cores, the high dimensional accuracy is required as described above. Therefore, the cross section of the wire member 9 is not limited to the circular configuration. For example, it is also preferable to use wire materials having cross-sectional configurations other than the circular configuration as shown in (A)–(G) of FIG. 5. (A) shows a wire for producing a two-core type ferrule, having an elliptic configuration. Phantom lines in the drawing correspond to optical fibers which are allowed to pass through the inside of the ferrule to be obtained by the electroforming with the wire member.

(B) of FIG. 5 shows a sectional view of a wire member for producing a three-core type ferrule, having a triangular cross-sectional configuration with rounded corners. (C) of FIG. 5 shows a sectional view of a wire member for producing a four-core type ferrule, having a quadrilateral cross-sectional configuration with rounded corners. (D) of FIG. 5 shows a sectional view of a wire member for producing a five-core type ferrule, having a pentagonal cross-sectional configuration with rounded corners. (E) of FIG. 5 shows a sectional view of a wire member for producing a six-core type ferrule, having a hexagonal cross-sectional configuration with rounded corners. (F) of FIG. 5 shows a sectional view of a wire member for producing a seven-core type ferrule, having a heptagonal cross-sectional configuration with rounded corners. (G) of FIG. 5 shows a sectional view of a wire member for producing a four-core type ferrule, having an oblong cross-sectional configuration. In (G) of FIG. 5, it is assumed that optical fibers indicated by phantom lines are arranged mutually adjacently at the inside of the obtained ferrule. The wires shown in (A)–(G) of FIG. 5 may have a shape without any rounded corners. The wires may be used in place of the wire member 9 shown in FIGS. 1 to 4.

Returning to FIG. 2, the air blow nozzles 6 discharge a small amount of air from their holes to agitate the electroforming solution 3. However, the agitation of the electroforming solution 3 is not limited to the method based on air, for which it is possible to adopt other techniques based on, for example, propeller, ultrasonic wave, and ultra-vibration. Especially, it is desirable to use the ultrasonic wave agitation in view of the maintenance of the linearity of the wire member 9.

Those appropriately selected and used for the wire member 9 include, for example, metal wires made of iron or alloy thereof, aluminum or alloy thereof, and copper or alloy thereof, those plated with thin solder on such metal wires, and plastic wires made of nylon, polyester, Teflon or the like. Among them, in the case of the plastic wire, it is necessary to apply electroless plating based on, for example, nickel or silver, in order to give conductivity to the surface. It is advantageous to use conductive plastic. In this case, when the electric power is applied to the conductive plastic to heat it after the electroforming, the extracting mold release is easily performed for the electroformed product. The wire member 9 determines the inner diameter of the ferrule obtained by the electroforming. Therefore, the high accuracy is required for the thickness, the roundness, and the linearity of the wire. The adjustment may be carried out for the thickness, the roundness, and the linearity of the wire by means of, for example, the method based on the extrusion with a die or the wire drawing, or the centerless processing. At present, in the case of a stainless wire having a diameter of 125 $\mu$m, for example, a stainless wire member product, which is in an error range of about ±0.5 $\mu$m, is available. In the case of the wires of the multiple-core type having the cross-sectional configurations other than the circular configuration as shown in FIG. 5, it is possible to obtain an accurate dimension by means of, for example, the extrusion based on a die.

Next, explanation will be made for the operation for forming the tubular member by means of the electroforming with the electroforming apparatus 100 shown in FIG. 2. The electroforming bath 50 is charged with the electroforming solution 3, and then a DC voltage is applied to the anodes 4 and the cathode 8 so that the current density is about 4 to 20 A/dm$^2$. When the electroforming is performed for about 1 day at the current density described above, an electroformed product having a thickness of a diameter of 3 mm is allowed to grow around the wire member 9. After completion of the electroforming, the support jig 5 is taken out of the bath 50, and the wire member 9 is removed from the support jig 5. The wire member 9 can be removed, for example, by extracting it from the electroformed product, or by dissolving it with a heated acidic or alkaline aqueous solution. In the case of a metal wire with solder plating, the metal wire may be extracted while heating it.

Figure 6:
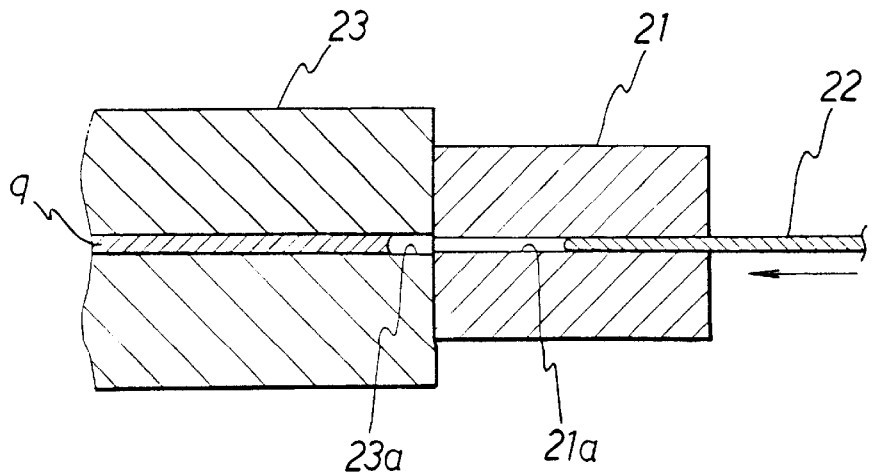
FIG. 6 conceptually illustrates a procedure for extruding the wire from an electroformed product in accordance with the method of the present invention.

Alternatively, the wire member 9 can be also taken out of the electroformed product by means of extrusion. For example, a cemented carbide pin 22 and a guide 21 having a through-hole 21a formed therein as shown in FIG. 6 are used to arrange the guide 21 with respect to the electroformed product 23 so that the through-holes 21a, 23a of them are coupled to one another with the cemented carbide pin 22 penetrating therethrough. Thus, the wire member 9 can be also extruded from the electroformed product 23 with the cemented carbide pin 22. It is desirable that this procedure is carried out after the end of the wire member 9 of the electroformed product 23 is slightly dissolved with a chemical agent.

Figure 7:
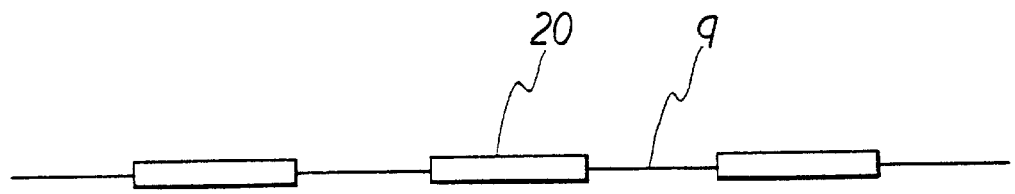
FIG. 7 conceptually illustrates the provision of tapes 20 disposed at predetermined spacing distances on the wire when the wire is extracted from the electroformed product in accordance with the method of the present invention.
Figure 8:
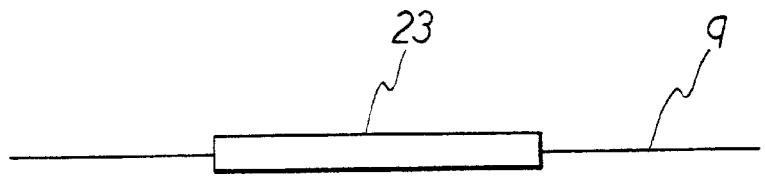
FIG. 8 conceptually shows the wire in a state in which the tape 20 illustrated in FIG. 7 has been peeled off after the electroforming.

The procedure, in which the wire member 9 existing at the center of the electroformed product is extracted, extruded, or dissolved with the chemical agent, may be determined depending on the selected material of the wire member 9. In general, when the wire member is difficult to be dissolved in the chemical agent, and it has a large tensile strength, then the extraction or extrusion procedure is preferably utilized. When the wire member is easily dissolved in the chemical agent, the dissolving procedure is preferably adopted. For example, when the wire member is made of iron or alloy thereof, the following procedure is available. That is, after the wire member 9 is subjected to the mold release treatment, the electroforming is carried out as described above while covering parts of the wire with the electrically insulating member 20 such as vinyl tape as shown in FIG. 7. When the electrically insulating member 20 is peeled off from the electroformed product to expose the wire member 9 as shown in FIG. 8, it is easy to extract the wire member 9 from the electroformed product 23. In the case of the metal wire applied with solder plating and the plastic wire applied with electroless plating, the wire may be extracted in the same manner as described above without performing the mold release treatment. In the case of the metal wire applied with solder plating, the wire may be extracted while being heated. When the extracting method is used, the wire member 9 is especially desirably a stainless wire as an alloy of iron. Experimentally, the extracting procedure was successfully performed for a stainless wire having a diameter of 0.126 mm having a length up to about 100 mm.

When the wire member 9 is made of, for example, aluminum or alloy thereof, or copper or alloy thereof, it is effective to perform the removal by means of dissolution, because the wire member 9 is easily dissolved in an acidic or alkaline aqueous solution. It is preferable to use a strongly alkaline aqueous solution as the dissolving solution which dissolves aluminum or alloy thereof and which scarcely affects the electroformed metal.

Specifically, the wire can be easily dissolved and removed by effecting heating to about 100±3° C. by using a strongly alkaline aqueous solution composed of, for example, sodium hydroxide or potassium hydroxide at a concentration of about 5 to 10 w/v %. Experimentally, an aluminum wire having a length of 10 mm was successfully dissolved and removed in about 90 minutes. In this case, it is unnecessary to perform the extraction. Therefore, it is unnecessary to perform the electroforming by covering the wire with the electrically insulating member as shown in FIG. 7. It is enough to perform the electroforming for the entire surface of the wire member 9. Further, it is unnecessary to perform the mold release treatment for the wire member 9.

The obtained electroformed product can be used as a ferrule after cutting the product into those having a predetermined length, for example, with a thin blade cutter. Especially, when the method of the present invention is used, the dimensional accuracy of the inner diameter of the ferrule is extremely high. The accuracy is determined by the dimensional error of the wire member 9 described above. In order to enhance the roundness of the outer diameter of the ferrule, it is preferable to perform finish machining for the outer circumferential portion. The finish machining for the outer circumferential portion may be performed such that the outer circumference is subjected to cutting by means of NC machining. When the wire member 9 is removed by means of the dissolving method, the following procedure is available. That is, after performing the electroforming, the linear electroformed product is cut into those having a desired length. After that, the wire member 9 is completely dissolved in the acidic or alkaline solution to form the through-hole at the inside of the electroformed product. Subsequently, the outer circumference can be finished by means of, for example, NC machining. In this case, the dissolving step may be carried out after the outer circumference is subjected to the machining.

The obtained ferrule may be fitted to a ferrule holder in order that the rotational direction of the ferrule is positionally determined, and the ferrule is accommodated in an optical fiber connector housing. In order to connect the optical fibers with the optical fiber connector based on the use of the ferrule, it is desirable to use the PC connection of the optical fibers with each other as described above. In order to perform the PC connection, the end surface of the ferrule is machined into a convex spherical surface or an inclined convex spherical surface, in a form in which the optical fiber is inserted into the ferrule. The machining can be carried out with an end surface grinder. The ferrule of the present invention is a ferrule made of metal formed by the electroforming. Therefore, the ferrule is advantageous in that the PC polishing operation can be performed easier as compared with conventional ferrules made of zirconia or glass. Further, it has been revealed that the height of the optical fiber tip after the PC polishing is approximately the same as that of the polished surface of the ferrule. Therefore, the optical fiber can be connected extremely accurately by using the ferrule of the present invention and the optical fiber connector containing the same. Accordingly, it is possible to realize the connection at low reflection loss.

First Embodiment

An aluminum alloy wire (alloy of copper, magnesium, and aluminum) of $\phi$=0.126 mm having a circular cross section was prepared. The wire was set to the jig 5 in a state of being stretched in the vertical direction by means of the elasticity of the spring 7 as shown in (A) of FIG. 3. The surface of the alloy wire was degreased by sufficiently wiping the surface of the alloy wire with gauze immersed with petroleum benzine. An electroforming solution 3 containing a major component of nickel sulfamate was charged in the electroforming bath 50 shown in FIG. 2. The four anodes 4, which were composed of nickel balls placed in a net made of titanium enclosed in a polyester bag, were installed at the four corners of the base 52 around the center of the wire member 9. The electroforming bath was heated to obtain a temperature of 55±5° C. while performing high speed filtration at a filtration accuracy of 1 $\mu$m. The jig 5 attached with the aluminum alloy wire was washed well with water, and then it was installed as shown in FIG. 2.

A DC voltage was applied to the cathode 8 and the nickel anodes 4 to give a current density of about 4 to 20 A/dm$^2$. The electroforming was carried out for 1 day under the condition as described above to obtain a nickel electroformed product having a thickness of $\phi$=about 3 mm. The electroformed product was taken out of the bath, and it was washed. After that, the electroformed product was cut into those having a length of 8.50 mm with an NC automatic machining machine. The cut electroformed product was immersed for 3 hours in a 20% sodium hydroxide aqueous solution heated to 100±5° C. to completely dissolve and remove the aluminum alloy wire. Thus, the electroformed product having a tubular configuration was obtained. Subsequently, the electroformed product was well washed with water by applying ultrasonic wave, followed by being dried. After that, the electroformed product was machined with the NC automatic machining machine to have a thickness (outer diameter) of 2.00 mm and a length of 8.00 mm. Thus, a finished product was obtained. The inner diameter was 0.126 mm ±0.5 $\mu$m along the axial direction, although no machining was performed at all after the electroforming. This fact means that the inner diameter dimensional error is determined by the error of the wire member (0.126 mm ±0.5 $\mu$m) when the method of the present invention is used, i.e., the ferrule having high accuracy can be produced with ease when an available highly accurate wire member is used.

Second Embodiment

Figure 9:
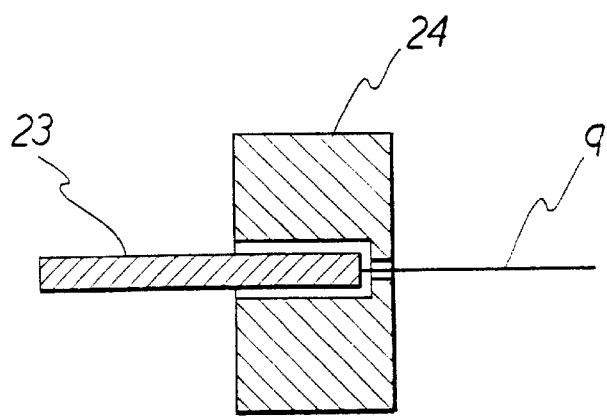
FIG. 9 conceptually illustrates a procedure for extracting the wire from the electroformed product by using a jig when the wire is extracted from the electroformed product in accordance with the method of the present invention.

A wire member 9 composed of SUS 304 of $\phi$=0.126 mm having a circular cross section was prepared, and the wire member 9 was set to the jig 5 in the same manner as in the first embodiment. As shown in FIG. 7, the wire member 9 was covered with a vinyl adhesive tape 20 at intervals of 40 mm. The jig 5 was washed with water, and then it was degreased and washed with water. After that, a mold release treatment was applied by immersing the wire member 9 at room temperature for 10 minutes in an aqueous solution of a mixture of commercially available Nikkanon Tack A, B produced by Nihon Kagaku Sangyo Co., Ltd. Subsequently, the wire member 9 was sufficiently washed with water, and then the electroforming was performed at 9 A/dm$^2$ for one day in the same manner as in the first embodiment to obtain a nickel electroformed product having a thickness of φ=about 3 mm in average. The electroformed product was set to an extracting jig 24 formed with a through-hole 24a as shown in FIG. 9. The wire member 9 was grasped by pincers to pull it, and it was extracted from the electroformed product 23. The electroformed product had a thickness of φ=about 3 mm and a length of about 40 mm with a pore (inner hole) of φ=0.126 mm formed at the axial center. The outer circumference of the electroformed product was subjected to cutting with a compact NC automatic machining machine about the center of the pore to obtain a finished product having a thickness of 2.00 mm and a length of 8.00 mm. The error of the inner diameter dimension was 0.126 mm ±0.5 μm in the axial direction, although no machining was applied at all after the electroforming, in the same manner as in the first embodiment.

Third Embodiment

An aluminum alloy wire having an elliptic cross section as shown in (A) of FIG. 5 was prepared. The aluminum alloy wire was an oval having a cross section with a minor axis of 0.126 mm and a major axis of 0.252 mm. The electroforming was performed with the aluminum alloy wire in the same manner as explained in the first embodiment. As a result, a two-core type ferrule was successfully obtained.

Fourth Embodiment

This embodiment is illustrative of a case of the production of a two-core type ferrule as shown in (B) of FIG. 1, especially a ferrule including two pores which are separated from each other by a partition wall in the ferrule.

Figure 10:
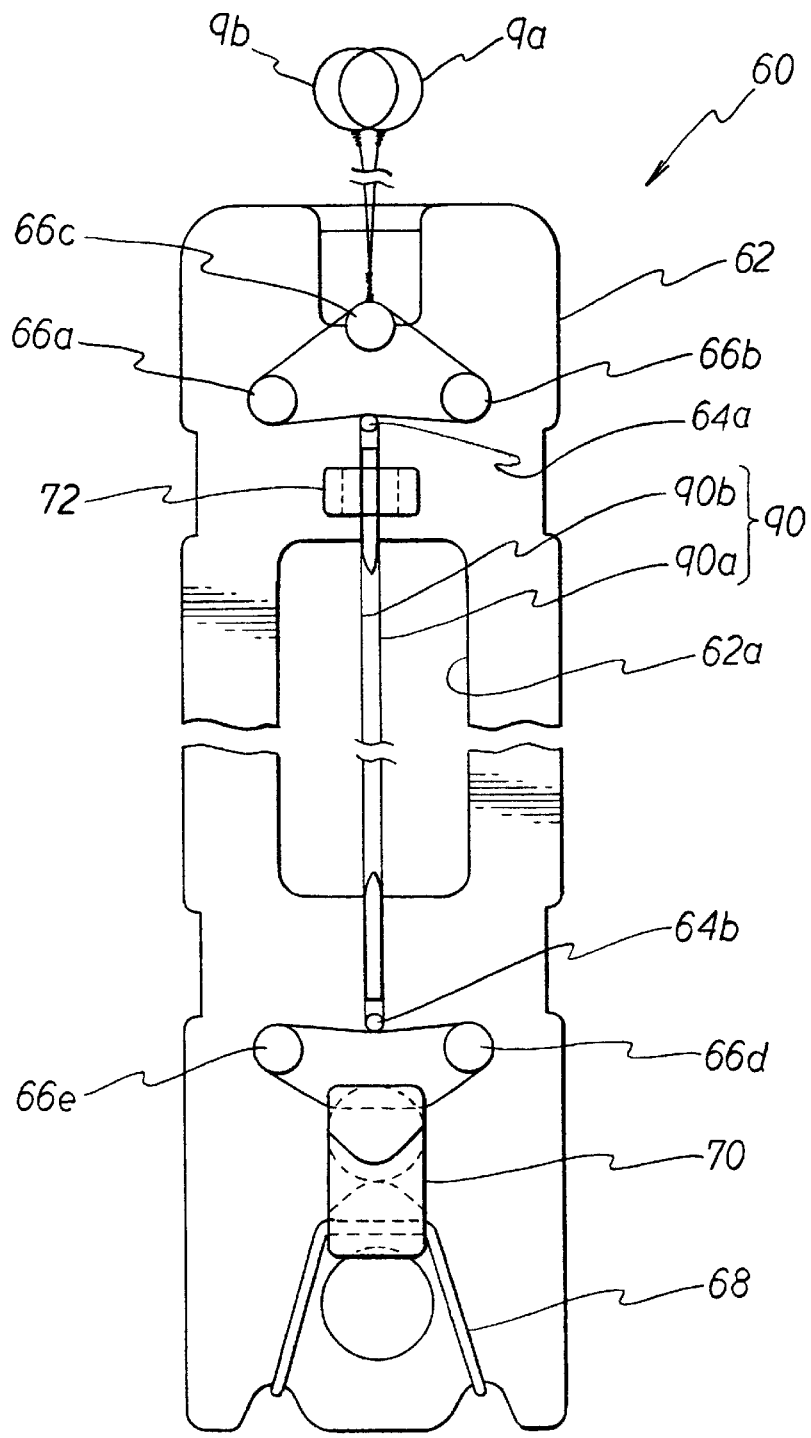
FIG. 10 shows a plan view illustrating a schematic arrangement of a support jig to be used in the fourth embodiment of the present invention.

A support jig 60 shown in FIG. 10 is a jig to be used in the electroforming bath in order to produce the two-core type ferrule as described above. The jig 60 has a pair of reference pins 64a, 64b for adjusting the spacing distance between the wire members 90, the reference pins 64a, 64b being embedded at mutually opposing positions on a base plate 62 made of plastic. Each of the reference pins 64a, 64b is a columnar pin made of stainless steel having a diameter of 500 μm, and each of them is embedded in the base plate surface to make protrusion at a height of 5 to 10 mm from the base plate surface. Guide pins 66 to 66e made of tungsten, which are used to guide the wire member 90 and remove any slack of the wire member 90, are provided on the base plate 62. The guide pins 66a to 66c maintain the tension of the wire member 90 disposed on the side of the reference pin 64a, and the guide pins 66d, 66e maintain the tension of the wire member 90 disposed on the side of the reference pin 64b. A hook holder 68 made of metal is provided at the lower end of the base plate 62. An opening 62a is formed at a central portion of the base plate 62 in order to avoid the anisotropy of the electrodeposition.

Figure 11:
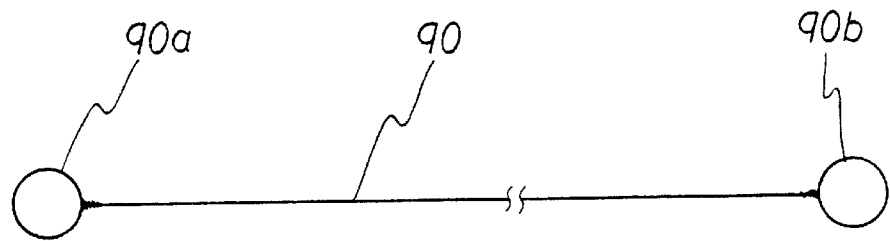
FIG. 11 conceptually shows a wire to be attached to the support jig shown in FIG. 10.

The wire member 90 is a wire made of aluminum alloy of φ=0.126 mm having a circular cross section. As shown in FIG. 11, rings 90a, 90b are formed at both ends of the wire member 90. The wire 90 is supported by the support jig 60 as follows. The first end 90a of the wire 90 is arranged at the upper end of the base plate 62. The wire 90 is allowed to extend successively along the guide pins 66c, 66b. The wire 90 partially circumscribes the reference pin 64a in the counterclockwise rotational direction, and then it is directed downwardly. Subsequently, the wire 90 partially circumscribes the lower reference pin 64b in the counterclockwise rotational direction, and then it partially circumscribes the guide pin 66d. The wire 90 passes through a hook 70 as described later on, and it partially circumscribes the guide pin 66d in the clockwise direction. Subsequently, the wire 90 partially circumscribes the lower reference pin 64b again in the counterclockwise direction, and then it is directed upwardly. The wire 90 partially circumscribes the upper reference pin 64a in the counterclockwise direction, and then it partially circumscribes the guide pin 66a to arrive at the upper end of the base plate 62. The both ends 90a, 90b of the wire are connected to one another on the guide pin 66c.

Figure 12A:
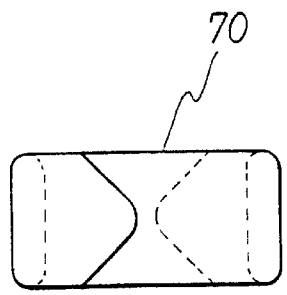
FIG. 12 shows a plan view (A) and a side view (B) illustrating a hook to be attached to the support jig shown in FIG. 10.
Figure 12B:
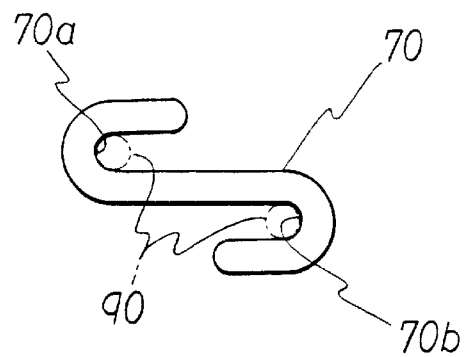

The wire 90 is pressed against the surface of the base plate 62 by the aid of a holding plate 72 between the reference pin 64a and the opening 62a. The wire 90 is hooked, under the guide pins 66d, 66e, by a first engaging section 70a of the hook 70 which has a shape as shown in (A) and (B) of FIG. 12. A second engaging section 70b of the hook 70 is hooked by an end of a hook holder 68. As described above, the tension is maintained for the first part 90a and the second part 90b of the wire 90 by the aid of the guide pins 66a to 66e, the reference pins 64a, 64b, and the hook 70. The spacing distance between the first part 90a and the second part 90b of the wire 90 stretched in parallel to one another over the opening of the base plate 62 is adjusted by the reference pins 64a, 64b. The spacing distance between the first part 90a and the second part 90b of the wire 90 can be easily changed by replacing the reference pins 64a, 64b with other pins having a different diameter. That is, when it is intended to produce a two-core type ferrule having a spacing distance of 300 μm based on the outer diameter of the through-hole, it is preferable to use reference pins 60a, 60b of φ=300 μm.

The support jig 60 shown in FIG. 10 was installed in the electroforming bath 50 shown in FIG. 2 in place of the support jig 5. In this procedure, the lower end of the base plate 62 of the support jig 60 was fixed on the base 52, and the upper end of the base plate 62 was supported at a position over the bath 50. The electroforming solution 3 was charged until it arrived at a height corresponding to the holding plate 72 of the support jig 60. The electroforming solution 3 and the electroforming apparatus 100 were constructed in the same manner as in the first embodiment except for the support jig 5.

Figure 13:
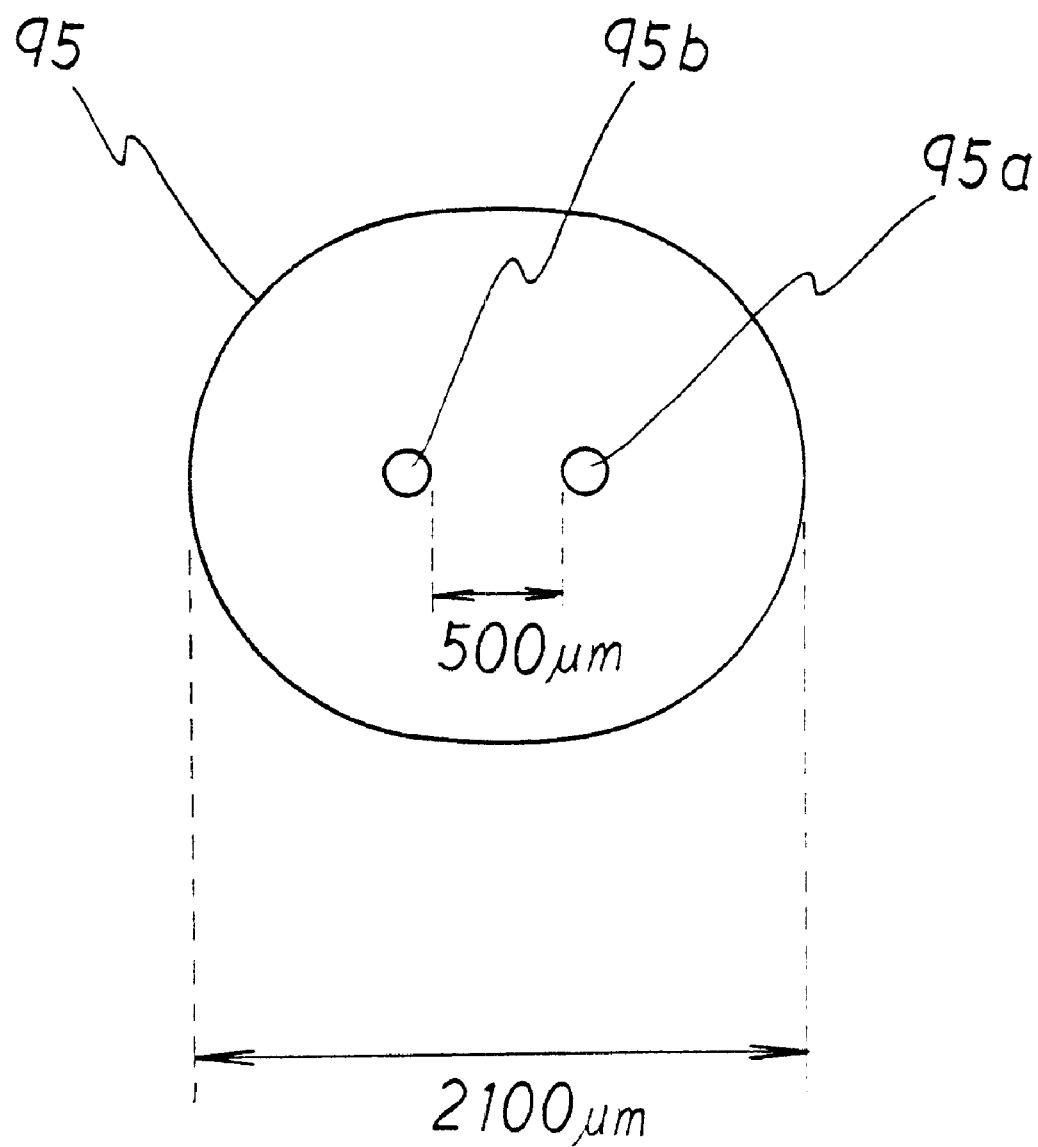
FIG. 13 shows a sectional view illustrating an electroformed product obtained in the fourth embodiment.

A DC voltage was applied to the cathode 8 and the nickel anodes 4 to give a current density of about 4 to 20 A/dm$^2$. The electroforming was carried out for 1 day under the condition as described above to obtain a nickel electroformed product having an elliptic cross section with a minor axis of about 1800 μm and a major axis of about 2100 mm. The electroformed product was taken out of the bath 50, and it was washed. After that, the electroformed product was cut into those having a length of 8.50 mm by using an NC automatic machining machine. The cut electroformed product was immersed for 3 hours in a 20% sodium hydroxide aqueous solution heated to 100±3° C. to completely dissolve and remove the aluminum alloy wire. Thus, a tubular electroformed product was obtained. FIG. 13 shows a sectional view of the obtained electroformed product. As shown in FIG. 13, the electroformed product 95 having an elliptic cross section had through-holes 95a, 95b having an inner diameter of 125 μm formed at the inside while being separated from each other by a spacing distance of 500 μm.

Subsequently, the electroformed product 95 was sufficiently washed with water by means of ultrasonic wave, followed by being dried. After that, the outer circumferential portion was subjected to cutting by using the NC automatic machining machine to process the product to have a perfect circular configuration of an outer diameter of 2000 μm. The product was machined to have a length of 8.00 mm. The inner diameter dimension of the through-holes 95a, 95b of the electroformed product 95 was 0.126 mm ±0.5 μm along the axial direction, although no machining was applied at all after the electroforming. This fact means that the inner diameter dimensional error is determined by the error of the wire member (0.126 mm ±0.5 μm) in the same manner as in the one-core type ferrule obtained in the first embodiment, i.e., the two-core type ferrule having high accuracy can be produced with ease when an available highly accurate wire member is used.

Fifth Embodiment

In this embodiment, the electroforming was carried out by using the same electroforming condition and the same electroforming apparatus as those used in the fourth embodiment except that a wire composed of SUS 304 of φ=0.126 mm having a circular cross section was used as the wire 90.

The wires of the obtained electroformed product were set to a jig which resembled the extracting jig shown in FIG. 9 but which had two through-holes. The pair of wires were grasped by pincers respectively to pull them, and they were extracted from the electroformed product. As shown in FIG. 13, the electroformed product had through-holes 95a, 95b having an inner diameter of 125 μm at the inside, the through-holes 95a, 95b being separated from each other by a spacing distance of 500 μm. Subsequently, the electroformed product was sufficiently washed with water by applying ultrasonic wave, followed by being dried. After that, an NC automatic machining machine was used to cut the outer circumferential portion, and the product was processed into a perfect circle having an outer diameter of 2000 μm. The product was processed to have a length of 8.00 mm. The inner diameter dimension of the through-holes 95a, 95b of the electroformed product 95 was 0.126 mm ±0.5 μm in the axial direction, although no machining was applied at all after the electroforming.

Sixth Embodiment

Figure 14:
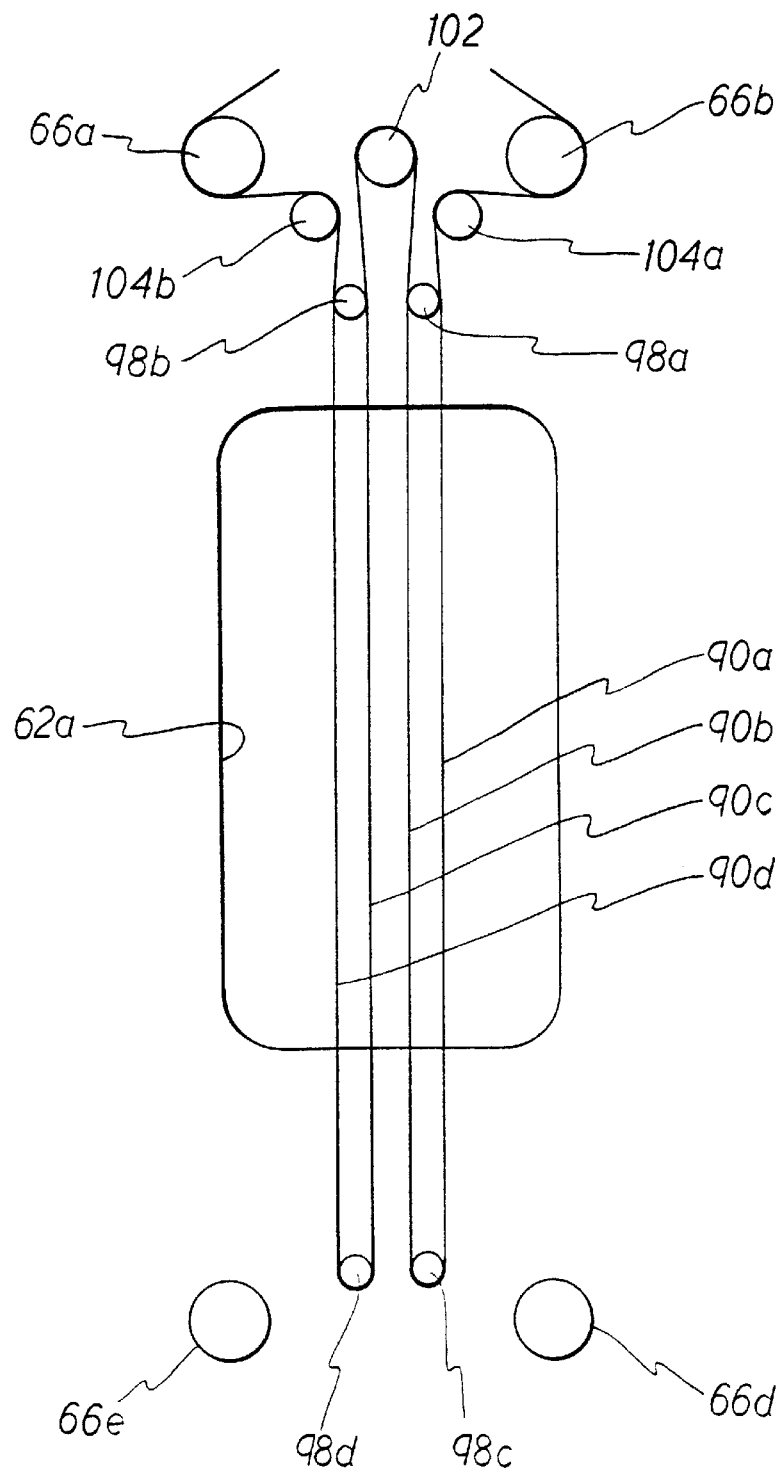
FIG. 14 conceptually shows a part of a wire support jig to be used to produce a ferrule having three or more cores.
Figure 19:
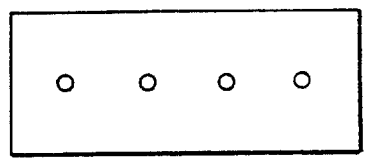
FIG. 19 shows a sectional structure of a ferrule obtain by performing the electroforming with an apparatus described in the sixth embodiment, followed by machining to give a rectangular parallelepiped-shaped contour.

The fourth and fifth embodiments are illustrative of the exemplary production of the two-core type ferrule. However, ferrules having three or more cores can be produced by improving the apparatus shown in FIG. 10. For example, as shown in FIG. 14, reference pins 98a to 98d are used in place of the reference pins 62a, 62b of the support jig shown in FIG. 10. Further, auxiliary guide pins 102, 104a, 104b are used. In this embodiment, it is unnecessary to use the guide pins 66d, 66e. When the pins are arranged as described above, the spacing distance between wire portions 90a, 90b of the wire 90 stretched via the pins is determined by the outer diameter of the reference pins 98a, 98c. The spacing distance between wire portions 90c, 90d is determined by the outer diameter of the reference pins 98b, 98d. The spacing distance between wire portions 90b, 90c is determined by the spacing distance based on the outer diameter of the reference pins 98a, 98b and the spacing distance based on the outer diameter of the reference pins 98c, 98d in consideration of the thickness of the wire. When the electrodeposition is performed by using the jig having the reference pins as shown in FIG. 14, a four-core type ferrule is obtained, which has through-holes separated from each other by predetermined spacing distances. The central positions of the four through-holes formed in the ferrule are automatically determined by the diameter and the embedded position of each of the reference pins 98a to 98d of the support jig. Therefore, it is possible to produce the ferrule including the optical fiber through-holes which are formed and arranged extremely highly accurately. The ferrule thus obtained may have, for example, a cross-sectional structure as shown in FIG. 19 by appropriately machine the contour after the electroforming.

The wire support structure shown in FIG. 14 is illustrative. It is possible to provide a support jig which makes it possible to form ferrules having five or more cores by means of the electroforming highly accurately with ease by appropriately increasing the number of reference pins.

Seventh Embodiment

This embodiment is illustrative of a case in which a sleeve for a mechanical splice is constructed by using the ferrule made of nickel produced in the first to third embodiments. The sleeve for the mechanical splice is a sleeve for permanently connecting two optical fibers. The sleeve can be formed, for example, by cutting out the through-hole of the ferrule produced in the first embodiment to have a tapered configuration, starting from both sides toward the inside of the ferrule as shown in (A) of FIG. 15. A slit 112 for releasing air when optical fibers are inserted from the both sides can be provided at a central portion in the longitudinal direction of the ferrule 110. The machining as described above is performed extremely easily, because the ferrule of the present invention is the ferrule made of metal obtained by the electroforming.

Figure 15A:
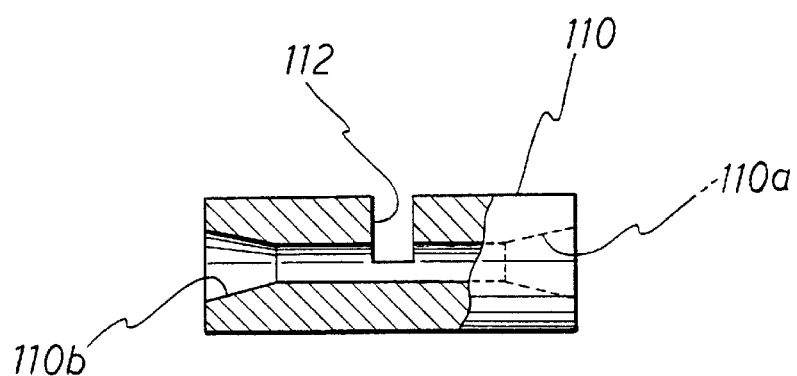
FIG. 15 illustrates an exemplary structure of a sleeve for a mechanical splice, wherein (A) of FIG. 15 shows a sectional view of the sleeve, and (B) of FIG. 15 shows a method for permanently connecting two optical fibers with the sleeve.
Figure 15B:
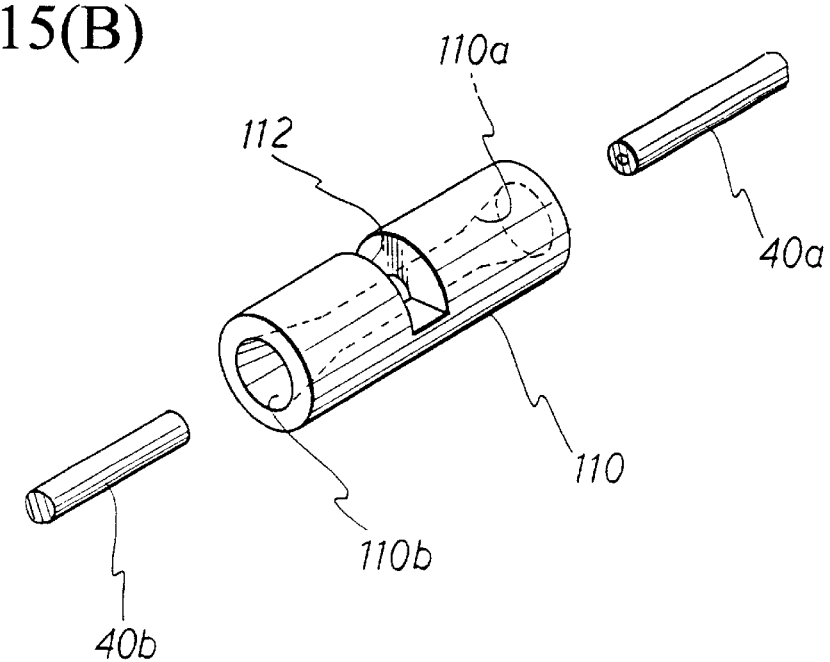

The sleeve (ferrule 110) thus obtained can be used as shown in (B) of FIG. 15 such that two optical fibers 40a, 40b are inserted into tapered holes 110a, 110b at the both ends of the sleeve, and they are connected at the central portion of the sleeve 110. The optical fibers 40a, 40b can be reliably fixed in the ferrule by forcibly inserting the optical fibers 40a, 40b, because the ferrule 110 of the present invention is made of metal. Therefore, it is unnecessary to make adhesion by using any adhesive. The optical fibers 40a, 40b can be fixed by means of welding, because the ferrule is made of metal.

Eighth Embodiment

Figure 16:
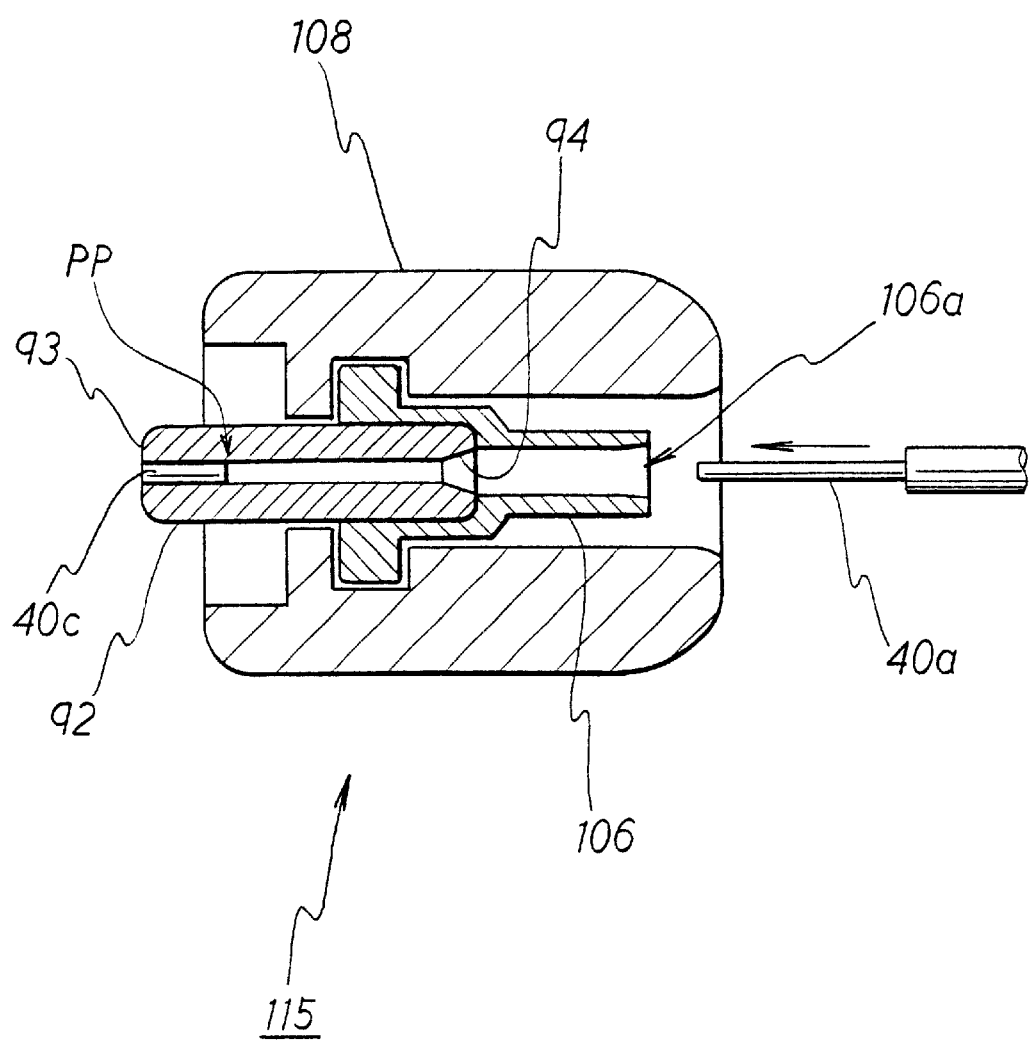
FIG. 16 shows a schematic sectional view illustrating a structure of an optical fiber connector plug according to the present invention.

This embodiment is illustrative of a case in which an optical fiber connector (connector plug) accommodating the ferrule produced in the first to third embodiments is constructed with reference to FIG. 16.

FIG. 16 shows an example of the optical fiber connector structure having been previously subjected to the PC polishing. The optical fiber connector 115 comprises a ferrule 92, a ferrule holder 106 for holding the ferrule so that the rotational position of the ferrule is determined, and a housing 108 for accommodating the above components to function as a plug. The ferrule made of nickel produced in the first embodiment was used as the ferrule 92. The through-hole is widened to form a tapered configuration at the rear end 94 of the ferrule 92 so that the optical fiber is easily inserted. The ferrule holder 106 has a through-hole 106 formed in a coaxial configuration having a diameter, for example, of 0.9 mm which is larger than the rear end 92b of the ferrule 92. The optical fiber is inserted into the through-hole together with its coated portion 400.

A connecting optical fiber 40c, which is shorter than the entire length of the ferrule 92, has been already inserted into the tip of the ferrule 92. The tip 93 of the ferrule 92 is previously applied with the PC polishing to have a convex spherical configuration together with the end of the optical fiber 40c. The PC polishing was performed with an end surface grinder. The ferrule 92 was polished by means of the PC polishing extremely easily and highly accurately, because the ferrule 92 was made of nickel.

As described above, the optical fiber, which is shorter than the entire length of the ferrule 92, is previously inserted into the optical fiber connector 115, and the PC polishing is applied beforehand before shipping. Accordingly, it is possible to omit the PC polishing operation at any connection job site. At the connection job site, the optical fiber 40a is inserted into the opening 106a formed in the ferrule holder 106. The optical fiber 40a is connected to the optical fiber 40c at a fiber connection point pp in the ferrule 92. The optical fiber connector 115 constructed at the job site as described above is coupled to another optical fiber connector jack, a connector section of an optical device, or an adapter for the optical fiber connector.

The mechanical strength of the ferrule of the present invention is higher than those of conventional ferrules made of ceramic or glass, because the ferrule of the present invention is made of metal. The ferrule of the present invention improves the durability concerning repeated PC junction and the durability of the connector itself.

Ninth Embodiment

This embodiment illustrates the connection between the optical fiber connector (connector plug) having the structure as shown in the eighth embodiment and another optical fiber connector.

Figure 17:
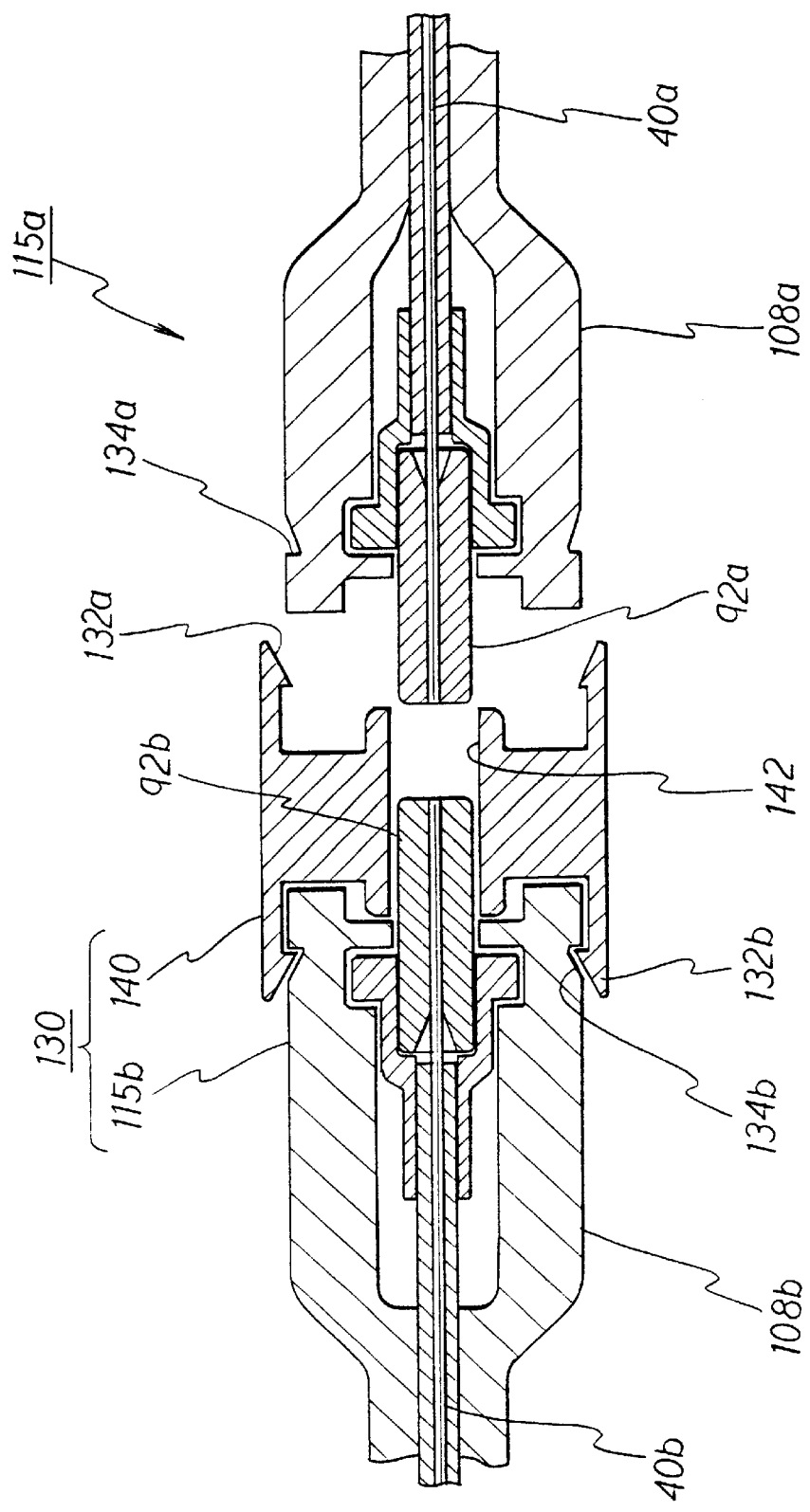
FIG. 17 shows a schematic sectional view illustrating a structure of an optical fiber connector according to the present invention.

FIG. 17 shows a situation in which the optical fiber connector 115a (herein referred to as "connector plug") described in the eighth embodiment is connected to an optical fiber connector jack 130 to be coupled to the connector plug 115a. An optical fiber 40a has been already introduced into the connector plug 115a, and subjected to the PC polishing at the tip of the ferrule 92a. The connector jack 130 comprises an adapter 140 and the connector plug 115b. The adapter 140 and the connector plug 115b are detachably coupled to one another by engaging an engaging hook 132b of the adapter 140 with an engaging section 134b formed on a housing 108b of the connector plug 115b. The connector plug 115b has the same structure as that of the connector plug 115a. The tip of the ferrule 92b is subjected to the PC polishing to have a convex spherical configuration together with the tip of the optical fiber 40b.

In order to couple the connector jack 130 to the connector plug 115a, the engaging hook 132a of the adapter 140 attached to the connector jack 130 is engaged with the engaging section 134a formed on the housing 108a of the connector plug 115a. When the connector jack 130 is coupled to the connector plug 115a, then the ferrule 92a and the ferrule 92b are aligned coaxially by the aid of an alignment sleeve 142 of the adapter 140, and their tips are subjected to PC junction highly accurately. Accordingly, the light is transmitted at low reflection loss via the PC junction from the optical fiber 40a to the optical fiber 40b or in the direction opposite to the above.

The optical fiber connector of this embodiment may be recognized as any one of the combination of the two connector plugs 115a, 115b and the adapter 140 and the combination of the connector plug 115a and the connector jack 130.

Tenth Embodiment

Figure 18:
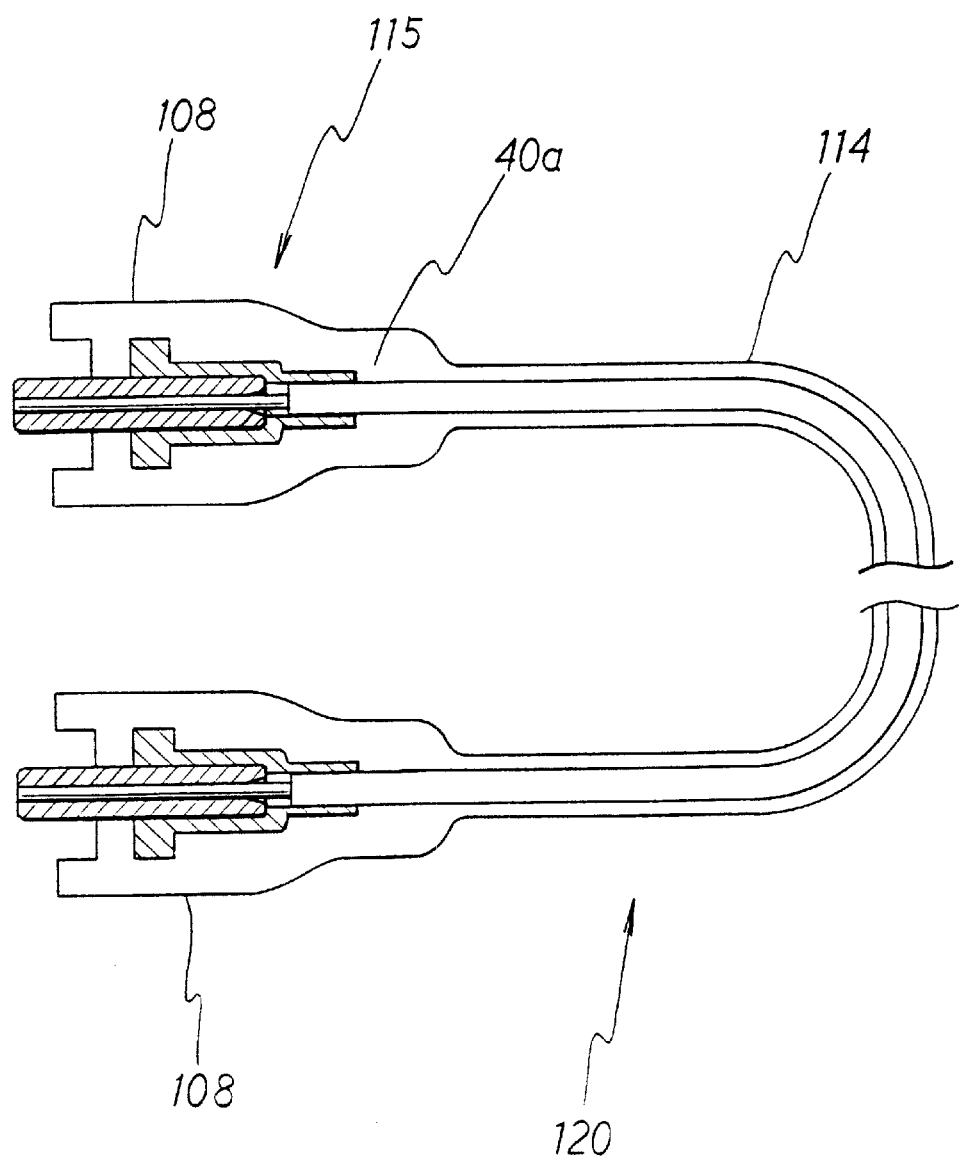
FIG. 18 shows a schematic sectional view illustrating a structure of an optical fiber connector-equipped optical cable according to the present invention.

FIG. 18 shows an example of the structure of an optical fiber connector-equipped optical cable (optical cable-equipped optical fiber connector). As shown in FIG. 18, the optical fiber connector-equipped optical cable 120 is constructed by connecting the optical fiber connector 108 as shown in FIG. 16 to both ends of the optical fiber cable 114. However, a single continuous optical fiber 40a has been already introduced into each of the ferrules. The optical cable 120 can be connected, for example, to another optical cable or another optical fiber connector by the aid of the adapter 140 as shown in FIG. 17.

Eleventh Embodiment

Figure 20:
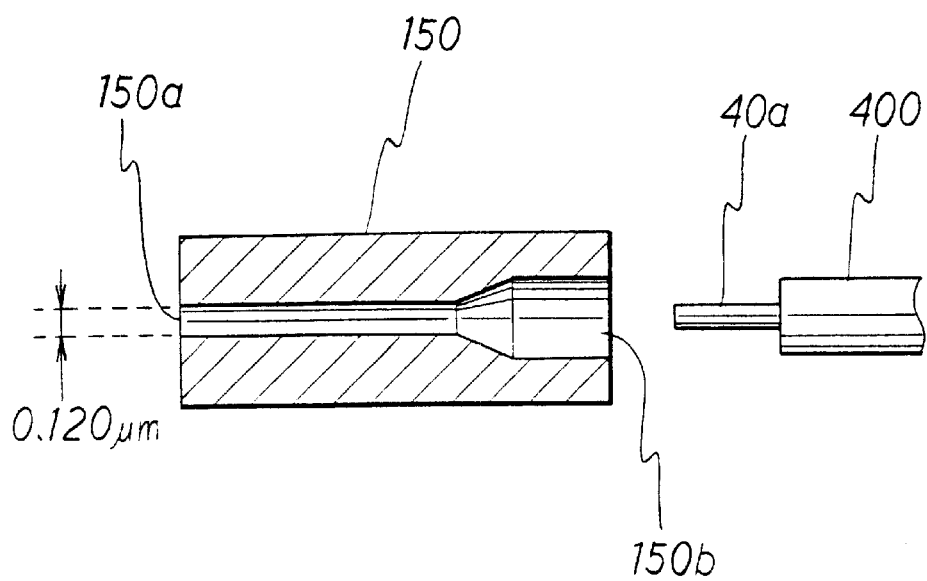
FIG. 20 shows a structure and a method of use of an integrated type ferrule comprising a ferrule and a conventional ferrule holder which are formed in an integrated manner.

FIG. 20 shows another embodiment of the ferrule of the present invention. A ferrule 150 shown in FIG. 20 is a columnar ferrule made of nickel-cobalt alloy formed by the electroforming. A pore 150a having a diameter of about 0.126 mm, through which an optical fiber passes, penetrates through the center of the column. The pore 150a is widened in a tapered configuration at one end, and it continues to a hollow section 150b having a diameter of 0.9 mm. The optical fiber 40a is inserted from the side of the hollow section 150b of the ferrule 150. A coated portion 400 (for example, φ=0.9 mm) of the optical fiber 40a is also inserted into the hollow section 150b. That is, the ferrule 150 functions as the ferrule 92 (92a, 92b) and the holder 106 (106a, 106b) shown in FIGS. 16 and 17. In the case of the conventional ferrule, the center of the pore is eccentric with respect to the outer circumference. Therefore, the reflection loss has been prevented from increase by rotating the holder so that the e mutual positions of the cores of the optical fibers are coincident. However, the ferrule obtained by the electroforming of the present invention has the extremely high dimension al accuracy of the inner diameter. Therefore, it is possible to omit the holder. In other words, the ferrule shown in FIG. 20 can be recognized as a holder-integrated ferrule.

Accordingly, the ferrule having the structure as shown in FIG. 20 can be accommodated in a connector housing without using any holder. Therefore, the use of the ferrule having such a structure m make s it possible to further simplify the structure of the optical fiber connector.

The ferrule having the structure as shown in FIG. 20 can be produced by means of the electroforming with a wire member having a shape corresponding to the pore 150a and the hollow section 150b, i.e., a wire member coaxially having a small diameter section corresponding to the pore 150a and a large diameter section corresponding to the hollow section 150b. Alternatively, an electroformed product having the pore 150a is formed by means of the electroforming with a wire member having a diameter corresponding to the pore 150a, and then the wire member is removed to cut the electroformed product into those having an appropriate size. Subsequently, one end of the obtained electroformed product is machined to apply cutting so that the pore 150a is deformed to have the shape of the hollow section 150b.

The present invention has been specifically explained above in accordance with the embodiments. However, the embodiments are merely exemplary, and improvements and modifications within a range of being conceived by those skilled in the art are included in the scope of the present invention. The embodiment described above is illustrative of the optical fiber connector which accommodates the one-core type ferrule. However, it is needless to say that the optical fiber connector can be constructed by using the multiple-core type ferrule as produced in the embodiments described above.

Explanation has been made as exemplified by the case in which the aluminum alloy and SUS are used as the material for the ferrule. However, arbitrary materials may be used provided that the electroforming can be performed with the materials. The optical fiber connector includes arbitrary optical fiber connectors accommodating the ferrule, including, for example, plug-type connectors, jack-type connectors, combinations of them, combinations of two plugs and an adapter, receptacles, and optical fiber cable-equipped connectors.

The present invention is based on the use of the electroforming method. Therefore, it is unnecessary to use any special molding machine and any mold which are expensive and which require durability. The ferrule can be easily produced with the cheap and versatile electroforming apparatus.

In the present invention, it is unnecessary to fire the molded product at a high temperature of 500 to 1200° C. as having been hitherto performed. It is sufficient to heat the electroforming solution to about 60° C. Therefore, the present invention lies in the method for producing the ferrule in which the energy cost is low, and the energy is saved.

In the present invention, the dimension transfer performance is extremely excellent, because the electroforming method is used. It is unnecessary to polish the electroformed product with the grinder, and hence the manual operation is omitted. Therefore, the defective ratio is decreased, and the productivity is improved. Especially, the dimensional error of the inner diameter of the obtained ferrule is determined by the dimensional accuracy of the wire member used as the base material for the electroforming. Accordingly, it is easy to manage the dimension of the product. Therefore, unlike the conventional technique in which the holder (capillary) for rotatably supporting the ferrule in the optical fiber connector is used when the ferrule is accommodated in the optical fiber connector, it is possible to omit the use of such a holder by using the ferrule of the present invention. Thus, the ferrule of the present invention makes it possible to simplify the structure of the optical fiber connector.

In the case of the conventional method, it has been extremely difficult to obtain the dimension by means of polishing for those of the multiple-core type, giving the problem that those having three or more cores are incapable of production. However, such ferrules can be easily produced in accordance with the method of the present invention substantially in the same manner as in the one-core type ferrule.

When the electroforming apparatus equipped with the supporting apparatus of the present invention is used, the multiple-core type ferrule can be produced easily and accurately at low cost.

The optical fiber connector of the present invention is provided with the ferrule made of metal formed by the electroforming. Therefore, it is easy to perform the PC polishing or the flat polishing therefore, and thus the productivity is excellent. Further, the PC polishing or the flat polishing can be performed highly accurately, and hence the highly accurately controlled connection can be made between the excellent ferrules. Thus, it is possible to realize the optical fiber connector with low reflection loss. Further, the ferrule made of metal is excellent in mechanical strength. Therefore, the present invention is also advantageous in that the durability of the PC junction and the durability of the optical connector are improved.

What is claimed is:

1. A method for producing a ferrule which is used for connecting optical fibers, the method comprising:
    depositing a metal by means of electroforming around at least one wire member to produce a rod-shaped electroformed product, the at least one wire member having a diameter slightly larger than the optical fibers; and
    extracting or extruding the wire member from the electroformed product without a chemical application for degrading the wire member and without applying heat for degrading the wire member.

2. The method for producing the ferrule according to claim 1, wherein the wire member has a circular cross section and a diameter of the wire member is not more than 0.13 mm.

3. The method for producing the ferrule according to claim 1, further comprising cutting an outer circumference of the electroformed product about a center of a through-hole formed by removing the wire member from the electroformed product.

4. The method for producing the ferrule according to claim 1, wherein the wire member is a wire member made of metal or plastic.

5. The method for producing the ferrule according to claim 1, wherein the at least one wire member is three wire members which are arranged to be separated from each other by an identical distance.

6. The method for producing the ferrule according to claim 1, wherein the wire member is made of aluminum or alloy thereof.

7. The method for producing the ferrule according to claim 1, wherein a mold release treatment is applied to the wire member before the electroforming.

8. The method for producing the ferrule according to claim 7, wherein the wire member is made of iron or alloy thereof.

9. The method for producing the ferrule according to claim 8, wherein the wire member is made of stainless.

10. The method for producing the ferrule according to claim 1, wherein the at least one wire member is two wire members which are arranged to be separated from each other by a predetermined distance.

11. The method for producing the ferrule according to claim 10, wherein the two wire members are positioned so that a pin having a predetermined size is interposed thereby.

12. A metal ferrule produced in accordance with the method as defined in claim 1, wherein an inner diameter accuracy of the metal ferrule is less than 0.5 $\mu$m.

13. The method for producing the ferrule according to claim 1, wherein the metal is one selected from the group consisting of aluminum, nickel, iron, copper, cobalt, tungsten, and alloys thereof.

14. The method for producing the ferrule according to claim 1, wherein the metal is nickel.

15. The method for producing the ferrule according to claim 1, further comprising cutting the electroformed product into those having a predetermined length.

16. A metal ferrule produced in accordance with the method as defined in claim 1.

17. The metal ferrule according to claim 16, wherein the ferrule has a columnar hollow section which penetrates in a longitudinal direction of the ferrule, the ferrule has, at its first end, a first opening which has the same diameter as that of the hollow section, and the ferrule has, at its second end, a second opening which has a diameter larger than the diameter of the hollow section.

18. The metal ferrule according to claim 17, wherein the hollow section includes a first hollow section, a second hollow section which has a diameter larger than that of the first hollow section, and a third hollow section having a tapered configuration which connects the first hollow section and the second hollow section.

19. The metal ferrule according to claim 18, wherein the optical fibers connected by the metal ferrule comprise a coated portion, wherein the coated portion is accommodated in the second hollow section, and wherein a clad of the optical fiber is accommodated in the first hollow section.

20. The ferrule according to claim 16, wherein a plurality of hollow sections for allowing the optical fiber to pass therethrough are formed.

21. The ferrule according to claim 16, wherein holes for allowing the optical fiber to penetrate therethrough have a tapered configuration at both ends of the ferrule, and the ferrule is used for a mechanical splice.

22. The ferrule according to claim 16, which is used for an optical fiber connector.

23. An optical fiber connector for connecting optical fibers, comprising:

the metal ferrule defined in claim 16; and a housing for accommodating the metal ferrule.

24. The optical fiber connector according to claim 23, further comprising a holder for holding the ferrule and positioning the ferrule in a rotational direction in the housing.

25. The optical fiber connector according to claim 23, further comprising, in the ferrule, an optical fiber which is shorter than a length of the ferrule, wherein a tip of the optical fiber and a tip of the ferrule has been PC polished.

26. The optical fiber connector according to claim 23, wherein the housing is a plug.

27. The optical fiber connector according to claim 26, further comprising an adapter for making detachable connection to the plug, the adapter having a sleeve for aligning the ferrule.

28. The optical fiber connector according to claim 23, further comprising a sleeve for aligning the ferrule.

29. The optical fiber connector according to claim 23, wherein the housing is a jack.

30. The optical fiber connector according to claim 23, further comprising an optical fiber cable, wherein a tip of an optical fiber of the optical fiber cable is located at a tip of the ferrule.

31. The optical fiber connector according to claim 30, wherein the tip of the optical fiber and the tip of the ferrule have been simultaneously polished.

32. The optical fiber connector according to claim 31, wherein the polishing is flat polishing or PC polishing.

* * * * *